(12) United States Patent
Procaccioli et al.

(10) Patent No.: US 11,593,538 B2
(45) Date of Patent: Feb. 28, 2023

(54) VERIFICATION, MODIFICATION, AND/OR VALIDATION OF AN INFRASTRUCTURE DESIGN DOCUMENT VIA IMPROVED COLLABORATION BETWEEN ON SITE DEVICES AND REMOTE DEVICES

(71) Applicant: Accenture Global Solutions Limited, Dublin (IE)

(72) Inventors: Emanuele Procaccioli, Rome (IT); Ettore Moroni, Rome (IT); Fabio Lattanzio, Barletta (IT); Diego Berti, Rome (IT)

(73) Assignee: Accenture Global Solutions Limited, Dublin (IE)

( * ) Notice: Subject to any disclaimer, the term of this patent is extended or adjusted under 35 U.S.C. 154(b) by 943 days.

(21) Appl. No.: 16/373,192

(22) Filed: Apr. 2, 2019

(65) Prior Publication Data

US 2020/0320173 A1 Oct. 8, 2020

(51) Int. Cl.
*G06F 30/18* (2020.01)
*G06F 16/787* (2019.01)
(Continued)

(52) U.S. Cl.
CPC ............ *G06F 30/18* (2020.01); *G06F 16/787* (2019.01); *H04L 9/3247* (2013.01); *G06F 30/12* (2020.01);
(Continued)

(58) Field of Classification Search
CPC ...... G06F 30/13; G06F 30/20; G06F 2111/02; G06F 9/451; G06F 30/12; G06F 2111/00;
(Continued)

(56) References Cited

U.S. PATENT DOCUMENTS

| 2007/0219722 A1* | 9/2007 | Sawyer, Jr. | ............ G01C 15/00 702/1 |
| 2010/0085376 A1* | 4/2010 | Nielsen | .................. H04L 69/22 345/589 |

(Continued)

FOREIGN PATENT DOCUMENTS

EP 3438899 A1 2/2019

OTHER PUBLICATIONS

Pizzoni, Francesco. "EAGLEPROJECTS.", Mar. 2019. 13 pages Mar. 2019. http://www.eagleprojects.it/Index.php.

(Continued)

*Primary Examiner* — Kibrom K Gebresilassie
(74) *Attorney, Agent, or Firm* — Harrity & Harrity, LLP

(57) ABSTRACT

A device receives an infrastructure design document that represents a network infrastructure design. The device causes the infrastructure design document to be displayed via a first interface of a geographic information system (GIS) tool that is to be used during an inspection of a site, where the inspection includes inspecting structural components that are to support equipment of a network. The device receives, from a user device, feedback data that is based on the inspection. The device causes the feedback data to be integrated into the GIS tool. The device receives, from another user device, instructions that are to be used to update the infrastructure design document. The device updates the infrastructure design document based on the set of instructions and performs actions that allow the infrastructure design document to be used when implementing the network infrastructure design.

20 Claims, 10 Drawing Sheets

(51) Int. Cl.
*H04L 9/32* (2006.01)
*G06F 30/12* (2020.01)
*G06F 111/00* (2020.01)
*G06F 119/22* (2020.01)

(52) U.S. Cl.
CPC ....... *G06F 2111/00* (2020.01); *G06F 2119/22* (2020.01)

(58) Field of Classification Search
CPC .... G06F 2119/22; G06F 30/18; G06F 16/787; H04L 9/3247
See application file for complete search history.

(56) References Cited

U.S. PATENT DOCUMENTS

| | | | | |
|---|---|---|---|---|
| 2011/0022433 | A1* | 1/2011 | Nielsen | G06Q 10/0633 |
| | | | | 705/7.27 |
| 2011/0119193 | A1* | 5/2011 | McLees | G06Q 10/00 |
| | | | | 705/348 |
| 2011/0224953 | A1* | 9/2011 | Webster | G06Q 10/10 |
| | | | | 703/1 |
| 2012/0011239 | A1* | 1/2012 | Svane | G06Q 10/10 |
| | | | | 709/223 |
| 2012/0065944 | A1* | 3/2012 | Nielsen | G06Q 50/06 |
| | | | | 703/1 |
| 2013/0152038 | A1* | 6/2013 | Lim | G06Q 10/103 |
| | | | | 717/101 |
| 2015/0163206 | A1* | 6/2015 | McCarthy | G06F 21/6218 |
| | | | | 726/4 |
| 2016/0321288 | A1* | 11/2016 | Malhotra | G06F 16/188 |
| 2016/0373309 | A1* | 12/2016 | Forbes | H04L 41/145 |
| 2017/0076563 | A1* | 3/2017 | Guerriero | G01M 3/243 |
| 2018/0152506 | A1* | 5/2018 | Simó | G06Q 10/06 |
| 2019/0385211 | A1* | 12/2019 | DeLuca | G06Q 30/0631 |

OTHER PUBLICATIONS

Extended European Search Report for Application No. EP19209885.3, dated Mar. 17, 2020, 16 pages.

Sestic M., "TeleCAD-GIS Enterprise/INOVA GIS Platform", Oct. 2, 2016, 12 pages, XP55675243, [retrieved on Mar. 10, 2020] Retrieved from the internet [URL: https://www.researchgate.net/profile/Maksim_Sestic/publication/311259987_TeleCAD-GIS_Enterprise_INOVA_GIS_Platform/links/5840302108ae2d21755f2aaf/TeleCAD-GIS-Enterprise-INOVA-GIS-Platform.pdf].

Simao A., et al., "Web-based GIS for Collaborative Planning and Public Participation: An Application to the Strategic Planning of Wind Farm Sites", Journal of Environmental Management, Elsevier, Netherland, May 1, 2009, vol. 90 (6), pp. 2027-2040, XP026065436.

TeleCAD GIS., "TeleCAD-GIS Overview", Feb. 2, 2013, 12 pages, XP55675218, [retrieved on Mar. 20, 2020] Retrieved from the Internet [URL: https://www.geoinova.com/attachments/article/45/TeleCAD-GIS%202013.pdf[.

* cited by examiner

VERIFICATION, MODIFICATION, AND/OR VALIDATION OF AN INFRASTRUCTURE DESIGN DOCUMENT VIA IMPROVED COLLABORATION BETWEEN ON SITE DEVICES AND REMOTE DEVICES

BACKGROUND

A geographic information system (GIS) is a system designed to capture, store, manipulate, analyze, manage, and display spatial or geographic data. A GIS system may include one or more GIS tools that allow users to search for the spatial or geographic data, analyze the spatial or geographic data, edit the spatial or geographic data, view the spatial or geographic data, and/or the like.

SUMMARY

According to some implementations, a method may include receiving, by a device, an infrastructure design document that represents a design of an infrastructure of a network. The method may include causing, by the device, the infrastructure design document to be displayed via a first interface, of a set of interfaces of a geographic information system (GIS) tool. The set of interfaces may be accessible to a first user device that is associated with a user that is to perform an inspection of a geographic area that is being targeted for installation of a set of equipment of the network. The inspection may include inspecting a set of structural components that are to support the set of equipment of the network. The method may include receiving, by the device and from the first user device, feedback data for feedback that is based on the inspection. The feedback data may include at least one of: verification data that verifies a set of characteristics of one or more structural components of the set of structural components, or modification data that describes one or more modifications to be made to the infrastructure design document. The method may include causing, by the device, the feedback data to be integrated into the GIS tool in a manner that allows the feedback data to be accessible via a second interface that is displayed on a second user device and that is part of the set of interfaces of the GIS tool.

According to some implementations, a device may include one or more memories, and one or more processors, operatively coupled to the one or more memories. The one or more processors may receive an infrastructure design document that represents a design of an infrastructure of a network. The one or more processors may cause the infrastructure design document to be displayed via a first interface, of a set of interfaces of a geographic information system (GIS) tool. The set of interfaces may be accessible to a first user device that is associated with a first user that is to perform an inspection of a site that is being targeted for installation of a set of equipment of the network. The inspection may include inspecting at least one of: a set of structural components that have already been installed at the site, or one or more locations that are targeted for installation of new structural components. The one or more processors may receive, from the first user device, feedback data for feedback that is based on the inspection. The feedback data may include modification data that describes a set of modifications to be made to one or more structural components of the set of structural components. The one or more processors may cause the feedback data to be integrated into the GIS tool in a manner that allows the feedback data to be accessible via one or more interfaces that are displayed on a second user device and that are part of the set of interfaces of the GIS tool. The one or more interfaces may include a set of interface display features that represent the set of structural components and that are selectable by users. An interface display feature for a particular structural component, when selected, may cause one of the one or more interfaces to display particular feedback for the structural component. The one or more processors may receive, from the second user device, a set of instructions that are to be used to update the infrastructure design document. The set of instructions may include at least one of: a first set of instructions to validate information included in the feedback data, a second set of instructions to implement at least one of the set of modifications included in the feedback, or a third set of instructions to implement one or more additional modifications. The one or more processors may update the infrastructure design document based on the set of instructions. The one or more processors may perform one or more actions that allow the infrastructure design document to be used when implementing the infrastructure of the network.

According to some implementations, a non-transitory computer-readable medium may store one or more instructions that, when executed by one or more processors of a device, may cause the one or more processors to: receive an infrastructure design document that represents a design of an infrastructure of a network. The one or more instructions may cause the one or more processors to provide the infrastructure design document for display via an interface, of a set of interfaces of a geographic information system (GIS) tool. The set of interfaces may be accessible to a first user device that is associated with a user that is to perform an inspection of a geographic area that is being targeted for installation of a set of equipment of the network. The inspection may include inspecting a set of structural components that are capable of supporting the equipment. The interface may include a set of interface display features that represent the set of structural components or the set of equipment at particular geographic coordinates on a map. The one or more instructions may cause the one or more processors to receive, from the first user device, feedback data for feedback that is based on the inspection. The feedback data may include at least one of: verification data that verifies a set of characteristics of one or more structural components of the set of structural components, or modification data that describes one or more modifications to be made to a subset of the set of structural components, or location data that identifies geographic locations of the first user device at times when the feedback data is generated. The one or more instructions may cause the one or more processors to integrate the feedback data into the GIS tool in a manner that allows the feedback data to be accessible via the interface by selecting the set of interface display features. The one or more instructions may cause the one or more processors to receive, from a second user device that has access to the GIS tool and that is associated with a second user, a set of instructions that are to be used to update the infrastructure design document. The set of instructions may include at least one of: a first set of instructions to validate information included in the feedback data, a second set of instructions to implement at least one of the one or more modifications included in the feedback, or a third set of instructions to implement one or more additional modifications. The one or more instructions may cause the one or more processors to update the infrastructure design document based on the set of instructions. The one or more instructions may cause the one or more processors to perform one or more actions that allow the infrastructure design document to be used when implementing the infrastructure of the network.

DETAILED DESCRIPTION

Figure 1A:
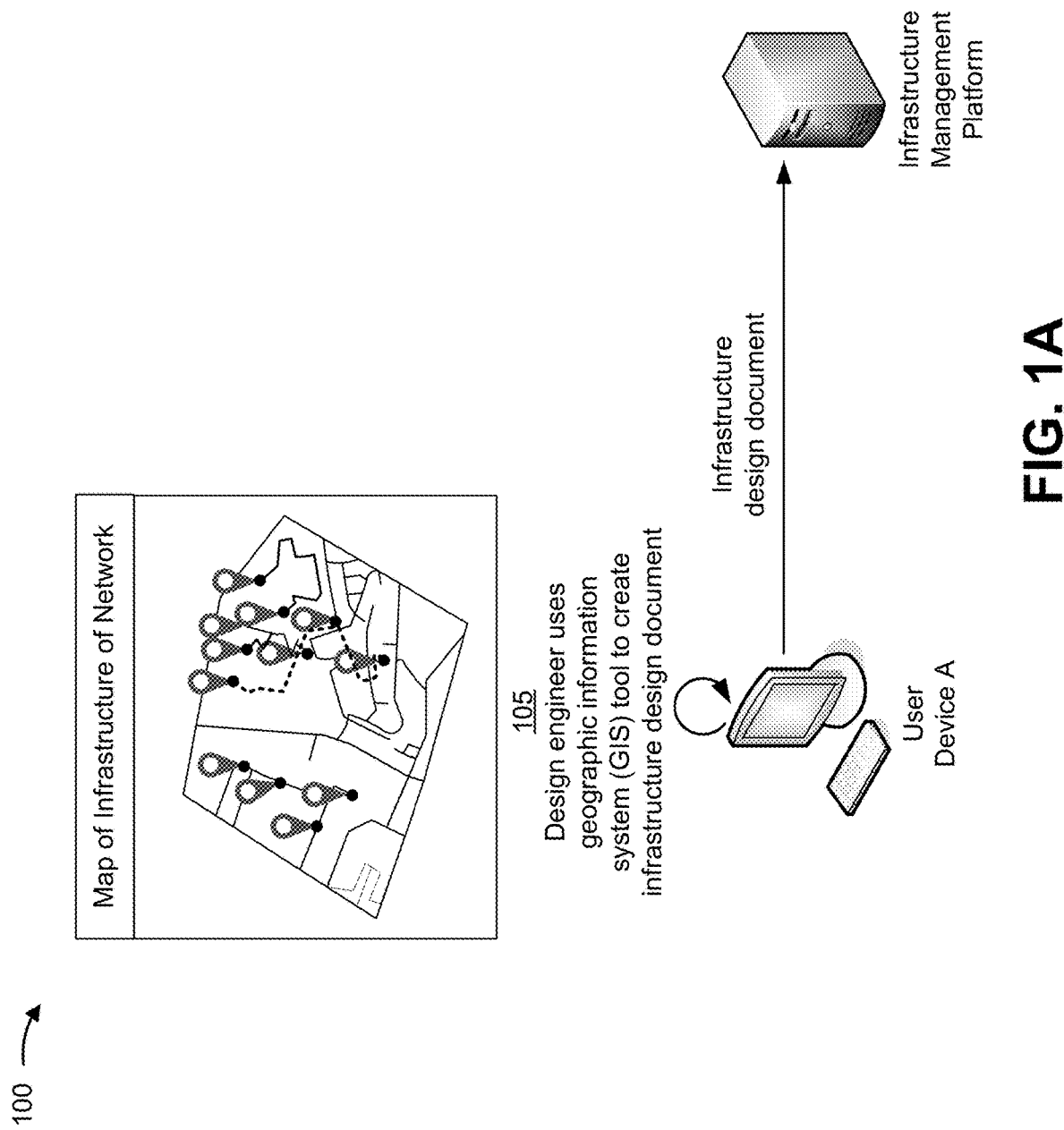
FIGS. 1A-1E are diagrams of one or more example implementations described herein.

The following detailed description of example implementations refers to the accompanying drawings. The same reference numbers in different drawings may identify the same or similar elements.

An infrastructure of a network may include physical equipment that allows the network to provide services (e.g., cellular services, data services, and/or the like). For example, a network, such as a fourth generation (4G) network, may be supported by a group of network devices (e.g., base stations, mobility management entities (MMEs), a serving gateway (SGW), and/or the like). Additionally, a set of fiber optic cables may be installed in a coverage area of the network to provide end users with high-speed data connections. For example, a populated area may have fiber optic cables near a group of buildings (e.g., office buildings, residential homes, etc.). To provide a building with a high-speed data connection, a signal (e.g., an optical signal, an electrical signal, etc.) sent from a nearby base station may, for example, need to travel through transmission lines, through one or more street cabinets, through fiber optic cables that are housed within underground ducts, and eventually through an electrical source of the building.

However, high-speed data driven by fiber optic cable is often only available in densely populated areas. Furthermore, to update an infrastructure of a 4G network to an infrastructure suitable to support a fifth generation (5G) network, a substantial amount of new equipment must be installed (e.g., new fiber optic cable, new base stations, and/or the like). This may be difficult given the large coverage that will require new equipment (e.g., millions of feet of new fiber optic cable may need to be installed throughout an entire country), given the lack of synergy between engineers that design the infrastructure and inspectors that are tasked with performing in-person inspections of areas targeted for installation of new equipment, and/or the like.

As an example, a designer may create a map of an infrastructure of a network and may provide the map to an inspector. To perform an inspection, the inspector may be required to visit a set of stops, such as a set of manholes, and may have to verify whether particular ducts are suitable for housing new fiber optic cables. However, without an effective way to document the inspection and without an effective way to collaborate with the designer, information collected by the inspector may be inconsistent, inaccurate, illegible (if the inspector is making hand written comments during the inspection), and/or the like. This may create a situation where the design of the infrastructure is unable to be updated until the designer and the inspector engage in multiple rounds of back and forth revisions, thereby wasting resources (e.g., processing resources, network resources, and/or the like) of one or more devices used to receive, transmit, and/or edit multiple iterations of drafts of the map of the infrastructure of the network.

Furthermore, without an effective way to improve collaboration between the designer and the inspector, resources of various devices may be wasted when installing new equipment at improper and/or sub-optimal locations. For example, if an inspector is unable to relay to the designer that a duct is damaged (by forgetting to write a comment on the map, by writing a comment that is illegible to the designer, etc.), resources may be wasted attempting to install new fiber optic cable in the damaged duct. Specifically, resources may be wasted contracting a construction crew to visit the duct location and attempt installation, resources may be wasted going back and forth with construction crew to determine and/or verify that the duct is unusable, resources may be wasted trying to modify a contract with the construction company after identifying that the duct is unable to house new fiber optic cable, and/or the like. Additionally, without an efficient and effective way to upgrade to an infrastructure that supports 5G technologies, a time needed to deliver the 5G technologies to end users may be increased, thereby increasing a time period where less efficient 4G technologies are being relied upon to provide services to end users.

Some implementations described herein provide an infrastructure management platform to assist with updating an infrastructure design document that is to be used when implementing an infrastructure of a network by orchestrating improved collaboration between two or more user devices that are involved in updating the infrastructure design document. For example, a design engineer may interact with a first user device to create and/or upload an infrastructure design document. The infrastructure design document may be integrated into a geographic information system (GIS) tool that is accessible to the first user device and to a second user device associated with an inspector. The inspector may be tasked with inspecting a set of structural components (e.g., a set of manholes, a set of ducts, and/or the like) used to support new equipment (e.g., a new set of fiber optic cables, and/or the like) that is to be installed as part of the infrastructure of the network.

When the inspector performs the inspection, the inspector may use the second user device to access the GIS tool and input feedback based on the inspection. This may cause feedback data to be provided to the infrastructure management platform. In this case, the infrastructure management platform may cause the feedback data to be integrated into the GIS tool such that the design engineer may be able to access the feedback. Additionally, the design engineer may use the first user device to validate particular feedback provided by the inspector, to reject particular feedback provided by the inspector, to make one or more additional modifications to the infrastructure design document based on the feedback data, and/or the like. This may cause a set of instructions that are to be used to update the infrastructure design document to be provided to the infrastructure management platform, which may cause the infrastructure management platform to update the infrastructure design document based on the set of instructions. Furthermore, the infrastructure management platform may perform one or more actions that allow the infrastructure design document that has been updated to be used when implementing the infrastructure of the network.

In this way, the infrastructure management platform efficiently and effectively assists in upgrading the infrastructure of the network. This reduces a total time needed to implement an upgraded infrastructure of the network (e.g., an infrastructure that supports 5G technologies), thereby conserving resources that would otherwise be wasted when user devices and/or network devices continue to use an old infrastructure to support less efficient, older technologies (e.g., 4G technologies). Furthermore, by improving collaboration between the first user device and the second user device, the infrastructure management platform conserves resources (e.g., processing resources, network resources, and/or the like) that would otherwise be wasted receiving, transmitting, and/or updating various drafts of the infrastructure design document (as would be needed with an inferior solution), conserves resources that would otherwise be wasted installing new equipment at improper and/or suboptimal locations, and/or the like.

FIGS. 1A-1E are diagrams of one or more example implementations 100 described herein. For example, example implementation(s) 100 may include a first user device (shown as User Device A), a second user device (shown as User Device B), and an infrastructure management platform that supports a geographic information system (GIS) tool.

As shown in FIGS. 1A-1E, the first user device may be associated with a design engineer who is authorized to create, modify, and/or update, an infrastructure design document that represents a design of an infrastructure of a network. The second user device may be associated with an inspector (e.g., a surveyor, an on-site technician, and/or the like) that is tasked with performing an in-person inspection of a set of structural components located at a site that is being targeted for installation of a set of equipment. The infrastructure management platform may assist the first user device and the second user device in verifying, validating, and/or updating the infrastructure design document, as shown further herein.

While some implementations described herein refer to the GIS tool as being hosted by the infrastructure management platform, it is to be understood that this is provided by way of example. In practice there may be one or more implementations where the GIS tool is hosted by a separate server. In these implementation(s), the infrastructure management platform may interact with the separate server to provide one or more services described herein.

As shown in FIG. 1A, and by reference number 105, a design engineer may use a geographic information system (GIS) tool to create an infrastructure design document. For example, the design engineer may use the first user device to access a feature of the GIS tool that allows the design engineer to create the infrastructure design document. In some implementations, the design engineer may upload the infrastructure design document to the GIS tool. When the infrastructure design document is created or uploaded, the infrastructure design document may be provided to the infrastructure management platform for further processing.

The infrastructure design document may represent a design of an infrastructure of a network. For example, the infrastructure design document may include a map, that may be displayed via the GIS tool, that depicts and/or describes the design of the infrastructure of the network. The network may be a fifth generation (5G) network, a fourth generation (4G) network, such as a 4G long term evolution (LTE) network, and/or another type of network. The infrastructure of the network may include a set of equipment and/or a set of structural components that protect and/or support (e.g., house, permit access to, and/or the like) the set of equipment. The set of equipment may include a set of cables (e.g., a set of fiber optic cables, and/or the like), a set of street cabinets, a set of transmission lines, a set of distribution point devices (e.g., a device located at a primary and/or secondary fiber distribution point, a device located at an outdoor (aerial) and/or outdoor (terrestrial) distribution point, and/or the like), a set of base stations, and/or the like. The set of structural components may include a set of ducts, a set of manholes used to access the set of ducts, a set of utility poles that support the set of transmission lines and/or the set of distribution point devices, and/or the like. Additionally, the infrastructure design document may depict a set of buildings that are present in a coverage area of the network, such as a set of commercial and/or residential homes, a local or a central authority building, and/or the like.

To provide an example, a telecommunication provider may begin to upgrade an infrastructure of a 4G network to an infrastructure of a 5G network. Because the 5G network will require a significant increase in an amount of fiber optic cable installed in particular coverage areas, the design engineer may be tasked with creating an infrastructure design document that includes a map indicating where to install new fiber optic cables, that indicates how much new fiber optic cable to install, and/or the like.

In some implementations (not shown), the infrastructure management platform may generate a labeled digital representation of the map of infrastructure design document. For example, if the design engineer uploads the infrastructure design document (e.g., which may be in an image format, a portable document format (PDF), and/or the like) to the GIS tool, the infrastructure management platform may process the infrastructure design document to generate the labeled digital representation of the infrastructure design document. In this case, the infrastructure management platform may process the infrastructure design document using one or more object recognition techniques and/or image processing techniques that allow the infrastructure management platform to identify and label objects within the map of the infrastructure design document. The objects may include particular pieces of equipment, particular structural components, particular buildings or landmarks, and/or the like.

Additionally, the infrastructure management platform may associate objects that have been identified with specific geographic coordinates. For example, if the map used by the design engineer did not include labeled geographic coordinates, the infrastructure management platform may compare the objects that have been identified with map data to determine a set of geographic coordinates that correspond to each of the objects and may add metadata identifying the set of geographic coordinates to the labeled digital representation of the map of the infrastructure design document.

In some implementations, the infrastructure management platform may generate one or more additional objects within the map. For example, if the map identifies a set of ducts that may be used to support a new set of fiber optic cables but does not identify a set of manholes that serve as access points to the set of ducts, the infrastructure management platform may access historical map data to identify locations of the set of manholes and may generate objects representing the set of manholes within the map.

In this way, the infrastructure management platform receives an infrastructure design document for further processing.

Figure 1B:
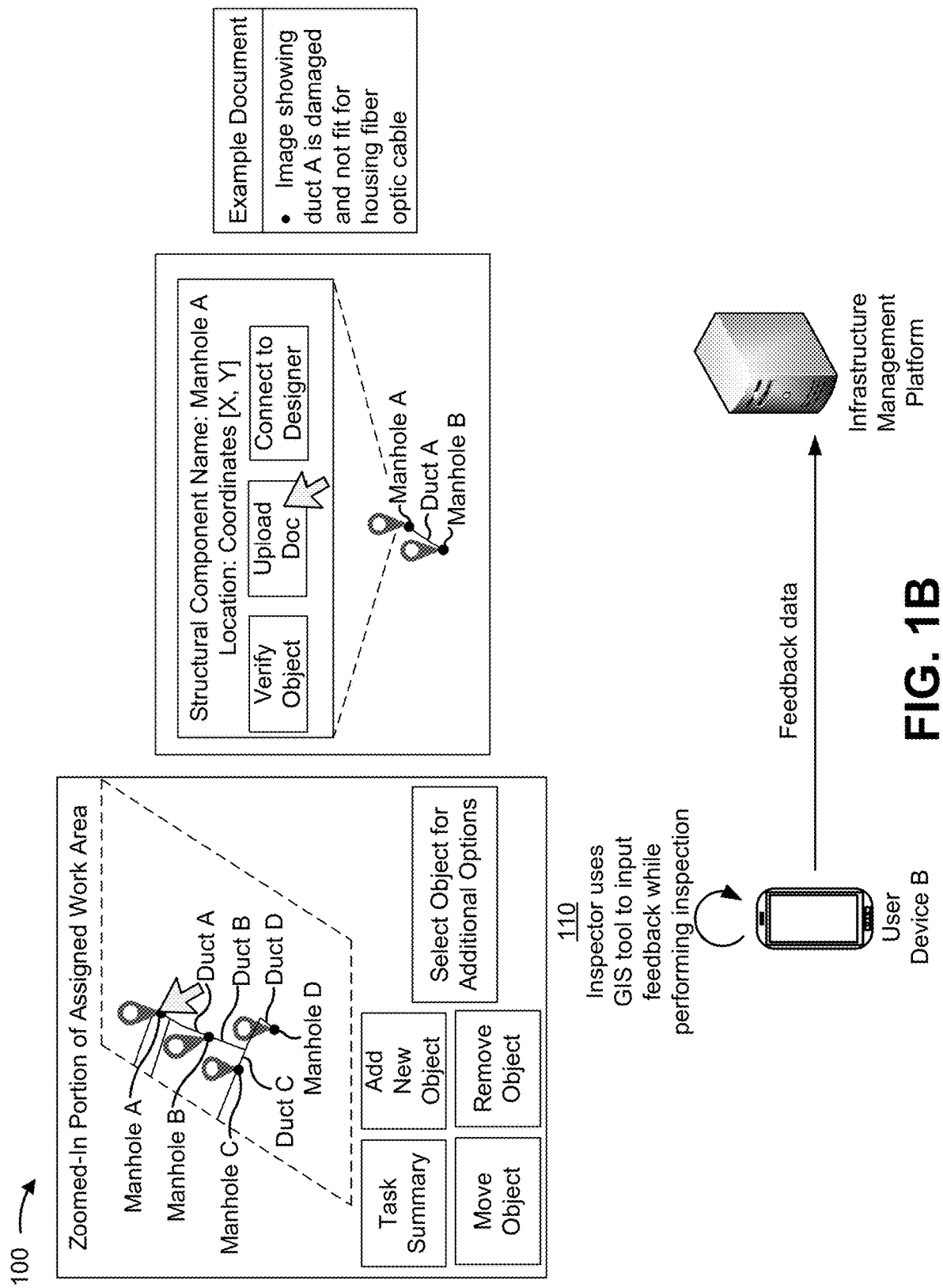

As shown in FIG. 1B, and by reference number 110, the inspector may interact with an interface of the GIS tool (as displayed on the second user device) to input feedback while performing the inspection. For example, the inspector may be tasked with performing an inspection of a site that is being targeted for installation of the set of equipment (e.g., the set of fiber optic cables, and/or the like) identified in the infrastructure design document. To perform the inspection, the inspector may have to visit a set of stops and may use the GIS tool to complete a set of tasks.

As an example, if a set of ducts are already installed at the site and the infrastructure design document identifies the set of ducts as structural components that are to house a new set of fiber optic cables, then the set of stops may include stops where the inspector visits particular manholes to inspect the set of ducts. As another example, if the infrastructure design document indicates that new ducts will need to be installed, the set of stops may include stops where the inspector visits areas of land that do not presently have ducts.

The set of tasks may include a task to verify a set of characteristics of a structural component, a task to recommend a modification to the map included in the infrastructure design document, a task to capture an image or a video of a structural component (e.g., as proof of work, as proof that supports a particular verification or recommended modification, and/or the like), and/or the like. To complete the set of tasks, the inspector may interact with the GIS tool to submit feedback, which may cause feedback data to be provided to the infrastructure management platform. The feedback data may include verification data that verifies a set of characteristics of one or more structural components of the set of structural components, modification data that describes one or more modifications to be made to the infrastructure design document, one or more documents that are being uploaded to support a particular verification or modification, patency data for one or more structural components (e.g., patency data for a structural component that includes an internal space, and/or the like), and/or the like.

As shown as an example, the inspector may visit a first stop (shown as Manhole A) and may complete one or more tasks that are part of the inspection. In this case, the inspector may use the second user device to log in to the GIS tool and may view an interface that illustrates an overhead view of the site (shown in FIG. 1A, and partially shown by the zoomed-in portion of the site in FIG. 1B).

The interface may include a set of menu buttons and a map that depicts the set of equipment that is to be installed to upgrade the infrastructure of the network. In some cases, the interface may, via the map, display a route that may be followed by the inspector to visit the set of stops. The set of menu buttons may include, for example, a task summary button, an add new object button, a move object button, a remove object button, and/or the like. The task summary button may display the set of tasks that are to be completed during the inspection. The add object button may permit the inspector to recommend adding a new structural component and/or a new piece of equipment to the map. The move object button may permit the inspector to recommend moving a piece of equipment from a first geographic location within the map to a second geographic location within the map. The remove object button may permit the inspector to recommend removing a structural component and/or a piece of equipment from the map.

In some implementations, the map may include one or more selectable objects that allow users to access additional menu buttons. For example, the inspector may select (e.g., click on, hover a cursor over, and/or the like) an object (e.g., Manhole A) on the map, which may cause the interface to update to display metadata for the object and one or more additional menu buttons. The metadata may include a structural component identifier, a location of the structural component, and/or the like.

The set of menu buttons may include a verify object button, an upload document button, a connect to design engineer button, and/or the like. The verify object button may permit the inspector to verify a set of characteristics of one or more structural components. For example, if the inspector selects the verify object button, the interface may update to display a first verification button to verify a geographic location of a structural component, a second verification button to verify a level of quality of a structural component, a third verification button to verify whether the structural component is available for supporting (e.g., housing, and/or the like) a particular piece of equipment, and/or the like.

As an example, the design engineer may have added a structural component to the map at a geographic location that was specified in historical records. In this example, the inspector may have a task to verify that an actual geographic location of the structural component matches the geographic location specified by the historical records. The inspector may compare the actual geographic location and the geographic location indicated on the map to determine whether to verify the geographic location of the structural component. To submit proof of verification, the inspector may select the first verification button, which may cause verification data to be provided to the infrastructure management platform.

As another example, the inspector may have a task to verify a level of quality of a structural component. In this example, the inspector may need to measure the level of quality by viewing the structural component and applying expert knowledge and/or by capturing an image or a video of the structural component that may be processed to determine the level of quality. As a specific example, the inspector may open up a manhole to access a duct and may see that the duct is damaged and/or not suitable for housing new fiber optic cable. To submit proof of verification, the inspector may select the second verification button, which may cause verification data to be provided to the infrastructure management platform. As another specific example, the inspector may open up a manhole to access a duct and may see that the duct is slightly damaged but may be unsure whether the duct is suitable for housing new fiber optic cable. In this case, the inspector may use the second user device to capture an image or a video of the duct and may use the upload document button to provide the image or the video to the infrastructure management platform. This may allow the infrastructure management platform to process the image or the video using one or more object recognition techniques to determine the level of quality of the duct. The infrastructure management platform may update the infrastructure design document to indicate the level of quality of the duct.

As another example, the inspector may have a task to verify whether a structural component is available for supporting a particular piece of equipment. In this example, the inspector may have to open the structural component or view an opening at an endpoint of the structural component to view contents within the structural component (which may indicate whether the structural component is available). As a specific example, the inspector may view an opening of a duct and may see that the duct is empty or may see that the duct is already filled with other fiber optic cables (e.g., which may belong to other telecommunication providers). If the duct is empty or has enough space available for new fiber optic cable, the inspect may select the third verification button, which may cause verification data to be provided to the infrastructure management platform. Similar to examples described above, the inspector may capture an image or a video of the opening of the duct, which may be used as proof that the duct is available, proof that the duct is unavailable, or as proof that the duct has limited availability (in which case the image or video may be made available to the design engineer who may make a determination as to the availability of the duct).

The upload document button may be integrated into the verify object button (as described above) and/or may be a separate button (as shown in FIG. 1B). The upload document button may permit the inspector to upload a document, such as an image document, a video document, and/or a text document. The document may depict and/or describe a state of a structural component, such as by depicting and/or describing a set of characteristics of a structural component, a defect or an issue relating to the structural component, and/or the like. In the example shown in FIG. 1B, the inspector may use the second user device to click on Manhole A, which may cause the interface to update to display object metadata for Manhole A and one or more menu buttons associated with Manhole A. Next, the inspector may use the second user device to capture one or more images of the duct (e.g., from various angles) and may click on the upload document button to cause the one or more images to be provided to the infrastructure management platform for further processing, as described elsewhere herein.

In some implementations, the inspector may use the second user device to select the connect to design engineer button. For example, the inspector may, during the inspection, encounter a situation that requires knowledge of the design engineer. When the inspector selects the connect to design engineer button, a request to establish a connection between the second user device and the first user device (accessible to the design engineer) may be provided to the infrastructure management platform. The connection may be an audio connection, a video connection, a virtual connection (e.g., using a virtual reality (VR) environment), and/or the like. In this case, the infrastructure management platform may interact with one or more network devices to cause the connection to be established, thereby allowing the inspector and the design engineer to collaborate in real-time during the inspection. Furthermore, while the connection is active, the inspector and/or the design engineer may use the first user device and/or the second user device to access one or more interfaces of the GIS tool.

While one or more implementations described herein refer to updating an infrastructure design document that is to be used to install a new set of fiber optic cables to coverage areas of the network, it is to be understood that this is provided by way of example. In practice, one or more implementations described herein may include updating an infrastructure design document that is used for installation of other types of equipment that require in-person inspection, such as installation of structural components of base stations, installation of structural components of street cabinets, installation of one or more software elements (which may be hosted by particular equipment), and/or the like.

In this way, the infrastructure management platform receives feedback data from the inspection for further processing.

Figure 1C:
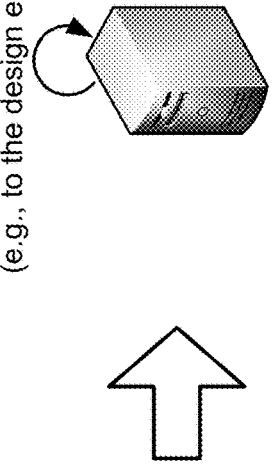
Figure 1C:
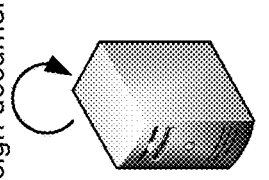
Figure 1C:
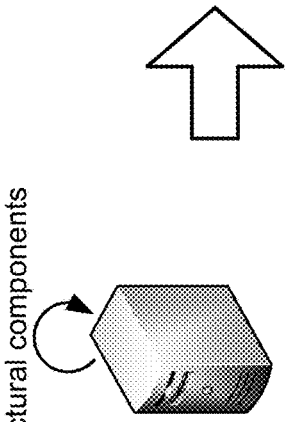

As shown in FIG. 1C, and by reference number 115, the infrastructure management platform may generate one or more graphical representations of particular structural components. For example, as the inspector is performing the inspection, the inspector may capture one or more images of a structural component or may record video of the structural component. In this case, the infrastructure management platform may process the one or more images or the video to generate a graphical representation of the structural component. The graphical representation may be a digital copy of the structural component that includes metadata identifying a set of attributes of the structural component. The set of attributes may include one or more measurements of the structural component, one or more materials that comprise the structural component, contents of the structural component, and/or the like. The graphical representation may be made available to the design engineer to permit the design engineer to validate a verification or modification made by the inspector, may be stored as proof of work completed, and/or the like, as described further herein.

In some implementations, the infrastructure management platform may identify a set of attributes of a structural component by using one or more attribute recognition techniques to process an image or a video. The one or more attribute recognition techniques may include a pattern identification technique, a matching technique, a color identification technique, a technique using computer vision, a natural language processing technique, a machine learning technique, and/or the like.

As an example, the infrastructure management platform may be configured with a labeled graphical representation of a duct that identifies a set of attributes of the duct (e.g., measured dimensions for the duct, a material used as part of the duct, example content that may be included within the duct, and/or the like), and/or the like. In this example, if the structural component is a duct, the infrastructure management platform may use the matching technique to compare the labeled duct to the image or the video to determine that the image or the video depicts a duct and to determine which pixels in the image or the video identify particular attributes of the duct.

In some implementations, the infrastructure management platform may use a three-dimensional (3-D) rendering technique or a similar type of technique to generate a graphical representation of the structural component. Continuing with the example above, by identifying the set of attributes of the duct, the infrastructure management platform may generate the graphical representation of the duct such that the graphical representation identifies the duct, identifies measurements and/or materials of the duct, identifies contents inside of the duct, and/or the like.

As shown by reference number 120, the infrastructure management platform may use machine learning to generate one or more recommendations for improving the infrastructure design document. For example, the infrastructure management platform may have trained a data model (and/or received a trained data model) to process input data to generate one or more recommendations for the design engineer. The input data may include an infrastructure design document, feedback data (e.g., which may include one or more images or videos uploaded by the inspector), and/or the like. The one or more recommendations may include a recommendation to accept or reject a verification made by the inspector, a recommendation to accept or reject a modification being recommended by the inspector, a recommendation to modify a structural component in a manner not recommended by the inspector, a recommendation to add a new structural component (e.g., which was not recommended by the inspector), and/or the like.

The data model may have been trained by using one or more machine learning techniques to process historical data. The one or more machine learning techniques may include a classification technique, a regression technique, one or more techniques used for training a neural network (e.g., a feedforward technique, a backpropagation technique, and/or the like), and/or the like. The historical data may include historical infrastructure design documents (e.g., drafts of other infrastructure design documents, final versions of the other infrastructure design documents, and/or the like), historical feedback data (e.g., provided by other inspectors, other design engineers, and/or the like), and/or the like.

In some implementations, the infrastructure management platform may identify a set of features that may be used to train the data model. For example, the infrastructure management platform may process the historical data using one or more feature identification techniques (e.g., an edge detection technique, a corner detection technique, a scale-invariant feature transform (SIFT) technique, a histogram of oriented gradients (HOG) technique, and/or the like) to identify a set of features that may be used to train the data model. The set of features may include a feature that indicates a characteristic and/or an attribute of a structural component, a feature that indicates an error made in an infrastructure design document (e.g., by a design engineer, by an inspector, and/or the like), a feature that indicates a trend relating to the error made in the infrastructure design document (e.g., when a particular error is present, another feature, such as a characteristic of a structural component, may also be present), and/or the like.

In some implementations, the infrastructure management platform may train the data model using the set of features. For example, the infrastructure management platform may use the classification technique and/or the regression technique to train the data model in a manner that enables the data model to output a particular recommendation based on particular input data provided to the data model.

Additionally, the infrastructure management platform may use the data model to generate a recommendation. For example, in a case where ducts frequently suffer from minor wear and tear, it may be common for inspectors to report a duct as too damaged to be used to house fiber optic cable, when in fact the ducts with minor wear and tear are still in good condition for housing fiber optic cable. In this example, if the inspector provides a recommendation to avoid using a particular duct based on the particular duct being damaged, the infrastructure management platform may be able to use the data model to process the feedback data, the infrastructure design document, and/or one or more images of the duct to generate a recommendation to reject the modification being recommended by the inspector.

Additionally, or alternatively (and not shown), the infrastructure management platform may use a data model to generate one or more recommendations for the second device (e.g., for the inspector). For example, the infrastructure management platform may train a second module of the data model described above or may train a new data model (or receive the new trained data model) to process an infrastructure design document and/or feedback data to generate one or more recommendations for the inspector. The second module of the data model or the new data model may be trained in a manner similar to that described above. Additionally, the second module of the data model or the new data model may generate a recommendation to verify a structural component, a recommendation to modify a structural component, a recommendation to add a new structural component, and/or the like. In this case, the infrastructure management platform may provide the one or more recommendations for display via the interface of the second user device to permit the inspector to review and accept or reject particular recommendations.

As shown by reference number 125, the infrastructure management platform may cause the feedback data, the one or more graphical representations of the particular structural components, and/or the one or more recommendations to be made available to the second user device (e.g., to the design engineer). For example, the infrastructure management platform may interact with the GIS tool (e.g., using a communication interface, such as an application programming interface (API) or another type of interface) to cause the feedback data, the one or more graphical representations of the particular structural components, and/or the one or more recommendations to be made available to the design engineer via one or more interfaces of the GIS tool.

In this way, the infrastructure management platform causes the feedback data, the one or more graphical representations of the particular structural components, and/or the one or more recommendations to be made available to the design engineer.

Figure 1D:
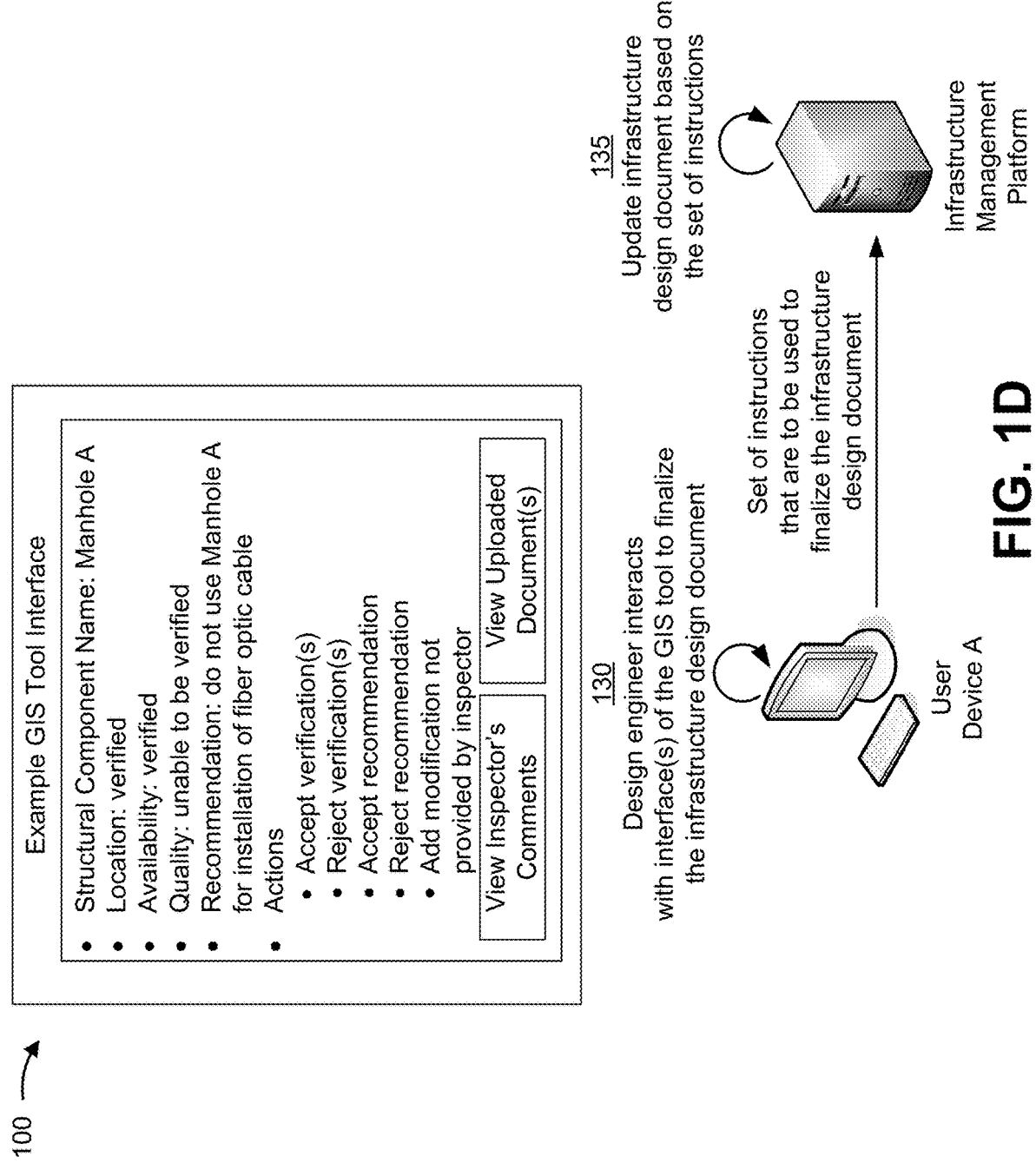

As shown in FIG. 1D, and by reference number 130, the design engineer may interact with one or more interfaces of the first user device to update the infrastructure design document. For example, the design engineer may log into the GIS tool and may access an interface that displays the map of the set of equipment that is to be installed and/or the set of structural components that will be used to support or house the set of equipment. In this case, the design engineer may select a structural component or a piece of equipment to cause the interface to display the feedback provided by the inspector. This may allow the design engineer to read the feedback and to determine whether to validate the feedback provided by the inspector.

In some implementations, the design engineer may interact with the first user device to validate a verification made by the inspector. For example, the design engineer may view the verification via an interface of the GIS tool, may confirm that the verification made is correct, and may validate the verification (e.g., by selecting a validation button available on the interface). If the design engineer does not agree with the verification, the design engineer may reject the verification (e.g., by selecting a reject verification button available on the interface).

Additionally, or alternatively, the design engineer may interact with the first user device to validate a modification recommended by the inspector. For example, the design engineer may view the verification via an interface of the GIS tool, may confirm that the modification being recommended is an appropriate modification to make, and may validate the modification (e.g., by selecting a validation button available on the interface). If the design engineer does not agree with the modification, the design engineer may reject the modification (e.g., by selecting a reject verification button available on the interface).

Additionally, or alternatively, the design engineer may interact with the first user device to input one or more additional modifications (e.g., that were not recommended by the inspector). For example, design engineer may interact with an interface of the GIS tool to input one or more additional modifications that are to be made to the infrastructure design document. The one or more additional modifications may be based on the feedback data, based on the one or more graphical representations of the particular structural components, based on the one or more recommendations made by the data model, and/or the like.

Additionally, or alternatively, the design engineer may use the first user device to accept or reject a recommendation provided by the data model. For example, the data model may have automatically generated a recommendation and the infrastructure management platform may have caused the recommendation to be displayed via an interface of the GIS tool. This may allow the design engineer to interact with a menu button displayed on the interface to accept or reject the recommendation. In some cases, the design engineer may use the first user device to explicitly request the recommendation, which may cause the data model to generate the recommendation and the infrastructure management platform to cause the recommendation to be displayed via the interface of the GIS tool.

Additionally, or alternatively, the design engineer may interact with an interface of the GIS tool to cause a graphical representation of a structural component to be displayed. For example, the design engineer may select a menu button for the graphical representation of the structural component which may cause the interface to update to display the graphical representation. This may allow the design engineer to consider the graphical representation when validating tasks completed by the inspector.

Additionally, or alternatively, the design engineer may interact with the first user device to select a connect to inspector button. For example, the design engineer may interact with an interface of the GIS tool to select the connect to inspector button, which may cause a request to establish a connection to the second user device to be provided to the infrastructure management platform. The connection with the second user device may be established in a manner described elsewhere herein.

In some implementations, the first user device may generate and provide a set of instructions to the infrastructure management platform. For example, when the design engineer makes a validation or a new modification to the infrastructure design document, the first user device may generate and provide a set of instructions to the infrastructure management platform. The set of instructions may include a first set of instructions to validate information included in the feedback data, a second set of instructions to implement at least one of the one or more modifications included in the feedback, a third set of instructions to implement one or more additional modifications that are to be made to the infrastructure design document, and/or the like.

In some implementations, the first user device may generate and provide one set of instructions to the infrastructure management platform. For example, the first user device may wait until the design engineer has finished reviewing the feedback provided by the inspector to generate one set of instructions to provide to the infrastructure management platform. Additionally, or alternatively, the first user device may provide a set of instructions to the infrastructure management platform each time that the design engineer inputs a validation or an additional modification.

As shown by reference number 135, the infrastructure management platform may update the infrastructure design document based on the set of instructions. For example, the infrastructure management platform may process the set of instructions to identify one or more validations and/or additional modifications made by the design engineer. In this case, the infrastructure management platform may update the infrastructure management platform by implementing particular modifications that were recommended by the inspector and validated by the design engineer and/or by implementing the one or more additional modifications made by the design engineer. Additionally, in some cases, the infrastructure management platform may update a data structure to store a record that specifies when the feedback data was collected, when the one or more validations were made, when the one or more additional modifications were created, and/or the like.

In some implementations, the infrastructure management platform may cause the infrastructure design document and the updated infrastructure design document to be displayed on the first user device. For example, the infrastructure management platform may cause the infrastructure design document and the updated infrastructure design document to be displayed simultaneously on an interface of the first user device, an interface of the second user device, and/or the like.

In this way, the infrastructure management platform receives the additional feedback data from the first user device.

Figure 1E:
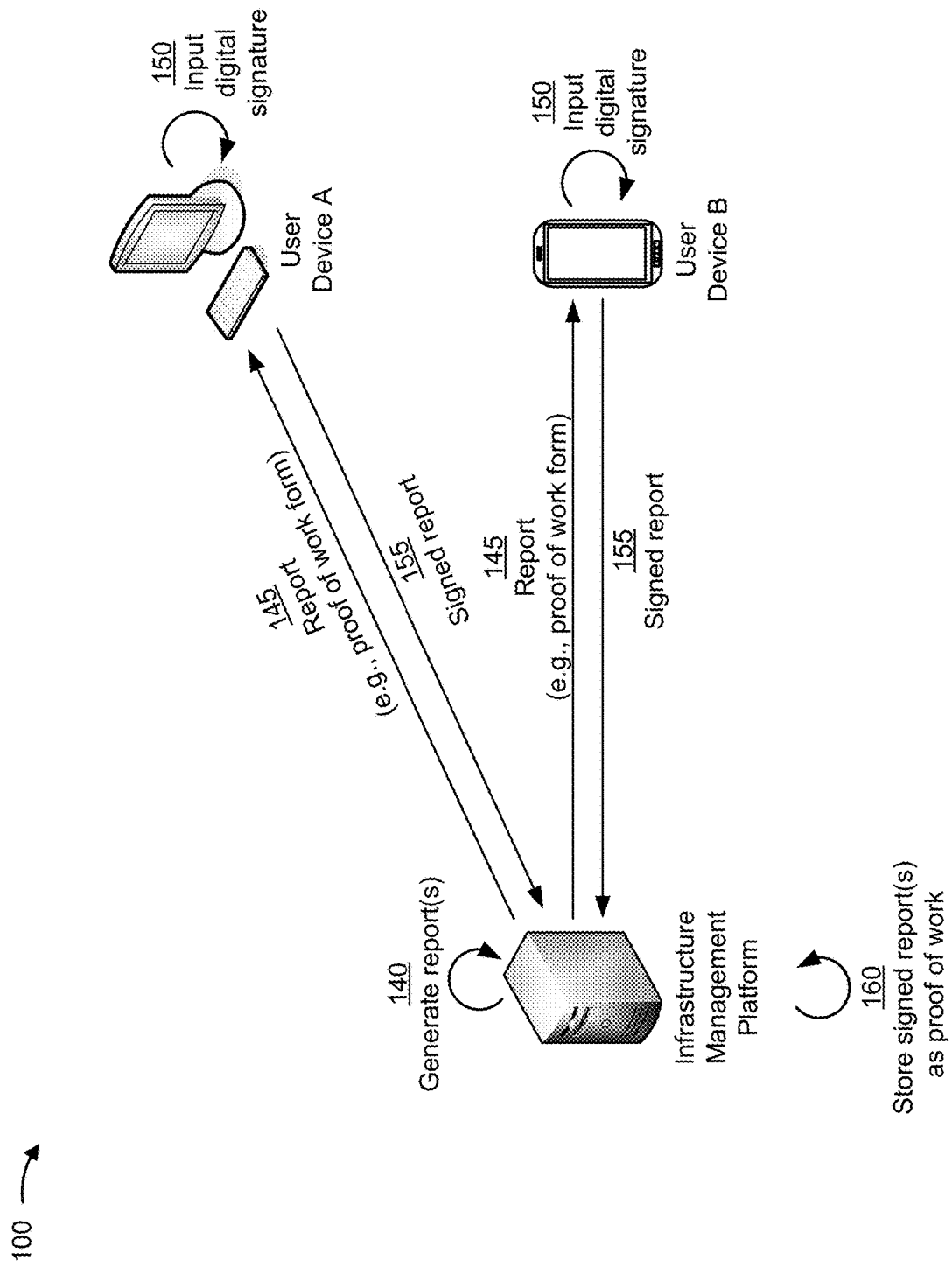

As shown in FIG. 1E, and by reference number 140, the infrastructure management platform may generate one or more reports. For example, the infrastructure management platform may generate a proof of work form for the inspector, may generate a proof of work form for the design engineer, and/or the like. In this case, for the telecommunication provider to contract with one or more construction companies to install a set of fiber optic cables, the telecommunication provider may need to provide the one or more construction companies with proof that an inspection of one or more sites has been completed, may need to prove that installing the set of fiber optic cables at locations identified in the infrastructure design document is compliant with one or more laws and regulations, and/or the like.

In some implementations, the infrastructure management platform may automatically populate a report. For example, the infrastructure management platform may identify a blank proof of work form for the inspector and may reference user profile data for the inspector to automatically populate a first field with a user identifier for the inspector. In this case, the infrastructure management platform may process the infrastructure design document to identify the set of stops included in the inspection performed by the inspector and may populate a first set of fields with identifiers for a set of structural components that were visited during the set of stops.

Additionally, the infrastructure management platform may process the feedback data and/or the one or more graphical representations of the particular structural components to automatically populate a second set of fields that serve as proof that each stop of the inspection was completed. For example, the infrastructure management platform may determine that the inspector visited Manhole A by referencing geographic locations of the second user device throughout the inspection to determine that the second user device was located at a set of geographic coordinates of Manhole A for a particular time period. This may allow the infrastructure management platform to populate a field that corresponds to the field that with the identifier for Manhole A with a value that identifies the particular time period.

Furthermore, the infrastructure management platform may process the feedback data to determine that the inspector chose not to verify Duct A and that the inspector uploaded one or more images proving that Duct A is damaged. This may allow the infrastructure management platform to populate a field that indicates that Duct A was not verified and to populate another field that describes a reason for Duct A not being verified (e.g., because of water damage).

Still further, the infrastructure management platform may process a graphical representation of Duct A to identify a set of attributes and/or characteristics of Duct A. This may allow the infrastructure management platform to populate a set of fields that describe the set of attributes of Duct A. In some cases, the infrastructure management platform may populate a field with a link, such as a hyperlink, to a storage location of the one or more images and/or the graphical representation of duct A. This may allow a particular user to download the one or more images that prove that duct A is damaged, to download the one or more images and/or the graphical representation to verify the set of attributes of Duct A, and/or the like.

As shown by reference number 145, the infrastructure management platform may provide the one or more reports to one or more user devices. For example, the infrastructure management platform may provide a first report (e.g., a proof of work form) to the first user device and may provide a second report (e.g., another proof of work form) to the second user device. This may allow the inspector and/or the design engineer to provide a digital signature indicating that the content in each respective report is accurate, as further described below.

As shown by reference number 150, one or more users may interact with the one or more user devices to input a digital signature. For example, the first report may be displayed on an interface of the first user device and the design engineer may interact with the interface to input a digital signature. As another example, the second report may be displayed on an interface of the second user device and the inspector may interact with the interface to input a digital signature. As shown by reference number 155, the one or more user devices may submit one or more signed reports to the infrastructure management platform. For example, the first user device may submit a first signed report to the infrastructure management platform and the second user device may submit a second signed report to the infrastructure management platform.

As shown by reference number 160, the infrastructure management platform may store the one or more signed reports as proof of work. For example, the infrastructure management platform may store the one or more signed reports using a data structure, such as a database (e.g., a relational database, and/or the like), a graph, a hash table, and/or the like.

In some implementations (not shown), the GIS tool may interact with an external device and/or may incorporate data collected from the external device. For example, the inspector may utilize particular equipment while performing the inspection. As a specific example, the inspector may use an odometer or a similar type of tool to measure distances during the inspection (e.g., a distance between two manholes, etc.). In some cases, the odometer may be configured to communicate with the GIS tool (e.g., if the odometer is supported by a processor and a communication interface). In other cases, the inspector may use the odometer to measure a distance and may input the distance measured (and/or a screenshot of the odometer reading) into the GIS tool. As another example, the inspector may utilize a high-resolution camera while performing the inspection. In this example, the camera may be configured to interact with the GIS tool and/or the inspector may upload images taken by the camera to the GIS tool.

As another example, the GIS tool may interact with one or more high-accuracy geolocation tools. For example, a global positioning system (GPS) of the second user device that the inspector takes on site may provide location data that is slightly inaccurate. To improve reporting accuracy of location data, one or more high-accuracy geolocation tools may interact with the GIS tool, such as an external antenna, a laser, a drone, and/or the like. For example, an antenna may be placed on site such that more accurate location data may be collected and provided to the GIS tool. As another example, a drone may fly over the site and may capture and report video data and/or location metadata to the GIS tool, thereby allowing the infrastructure management platform to process the video data and/or the location metadata and to integrate the processed data into the GIS tool. By enabling the GIS tool to interact with external devices and/or by integrating data collected from the external devices into the GIS tool, the infrastructure management platform improves accuracy of data reported during the inspection, thereby conserving resources (e.g., processing resources, network resources, and/or the like) that would be wasted reporting inaccurate data, resources that would be wasted attempting to collect more accurate data on subsequent inspections, and/or the like.

Additionally, or alternatively, the infrastructure management platform may integrate augmented reality (AR) functionality into the GIS tool. For example, the infrastructure management platform may implement an AR navigation feature into the GIS tool, an AR feature providing the inspector with over-the-shoulder support, an AR feature to assist with performing tasks that are part of the inspection, a virtual collaboration feature, and/or the like. As a specific example, if the inspector is tasked with verifying structural integrity of a duct, the inspector may use an AR tool that will display the duct (and/or a labeled three-dimensional (3-D) rendering of the duct), where an augmented reality displays 3-D arrows pointing to specific areas of the duct (and/or to specific areas of the labeled 3-D rendering of the duct). By integrating AR functionality into the GIS tool, the infrastructure management platform improves accuracy of data reported during the inspection, thereby conserving resources would be wasted reporting inaccurate data, resources that would be wasted attempting to collect more accurate data on subsequent inspections, and/or the like.

In some implementations (not shown), the infrastructure management platform may generate a bid for a construction project to build or install the set of equipment that is part of the infrastructure of the network. For example, the infrastructure management platform may apply a robotics process automation (RPA) technique to parse bids that are being made via an online marketplace. The RPA technique may allow the infrastructure design platform to visit the online marketplace, to identify bids relating to similar construction projects, and to analyze the bids and/or historical bids to identify an optimal price to utilize for the bid for the construction project to install the set of equipment. Additionally, the infrastructure management platform may provide the bid for display via a bidding interface that is accessible to a group of devices associated with one or more construction companies. In this way, the infrastructure management platform assists the telecommunication provider in securing an optimal bid, thereby reducing a utilization of resources (e.g., processing resources, network resources, and/or the like) of devices that would be used to manually attempt to secure the optimal bid, conserving processing resources that might otherwise be wasted obtaining a suboptimal bid, and/or the like.

Additionally, or alternatively, the infrastructure management platform may assist a construction company with implementing the infrastructure of the network. For example, after a contract with a construction company is finalized, the infrastructure management platform may configure the GIS tool with a feature that generates instructions that describe how to install the set of equipment, a feature that generates instructions that indicate where to install the set of equipment, a feature that generates instructions that recommend a schedule that may be followed to install the set of equipment in a timely manner (e.g., as may be required by the contract), and/or the like.

As another example, the infrastructure management platform may configure the GIS tool with a set of features that may be used to manage a set of construction activities. In this example, the GIS tool may include a feature for performing a safety inspection of a construction site, a feature for performing an inspection of machinery found at the construction site, a feature for a construction worker that provides the construction worker with a day-to-day checklist to create a record of tasks completed and/or to upload verifiable proof of tasks completed, a feature for managing and/or verifying completion of particular construction activities, and/or the like. To provide a few specific examples, the GIS tool may include a feature for verifying installation of a fiber optic cable (e.g., fiber to the x (FTTx)), a feature for verifying quality of the fiber optic cable, a feature for verifying installation of fixed wireless access (FWA), a feature for verifying quality of the FWA, a feature for performing end-to-end (E2E) testing, a feature for verifying performance of E2E testing, and/or the like. In this way, the infrastructure management platform helps ensure that the construction company is able to implement the infrastructure in an accurate, time efficient manner. In some cases, this reduces a time needed to upgrade an infrastructure of a 4G network to an infrastructure of a 5G network, thereby conserving resources that would be wasted by inefficiently continuing to support customers via the 4G network.

In this way, the infrastructure management platform efficiently and effectively assists in upgrading the infrastructure of the network. For example, by improving collaboration between the first user device and the second user device, the infrastructure management platform conserves resources (e.g., processing resources, network resources, and/or the like) that would otherwise be wasted receiving, transmitting, and/or updating multiple iterations of drafts of the infrastructure design document (as would be needed with an inferior solution), conserves resources that would otherwise be wasted installing new equipment at improper and/or sub-optical locations, and/or the like.

As indicated above, FIGS. 1A-1E are provided merely as one or more examples. Other examples may differ from what is described with regard to FIGS. 1A-1E. For example, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple and/or distributed devices. Additionally, or alternatively, a set of devices (e.g., one or more devices) included in the one or more example implementations 100 may perform one or more functions described as being performed by another set of devices included in the one or more example implementations 100.

Figure 2:
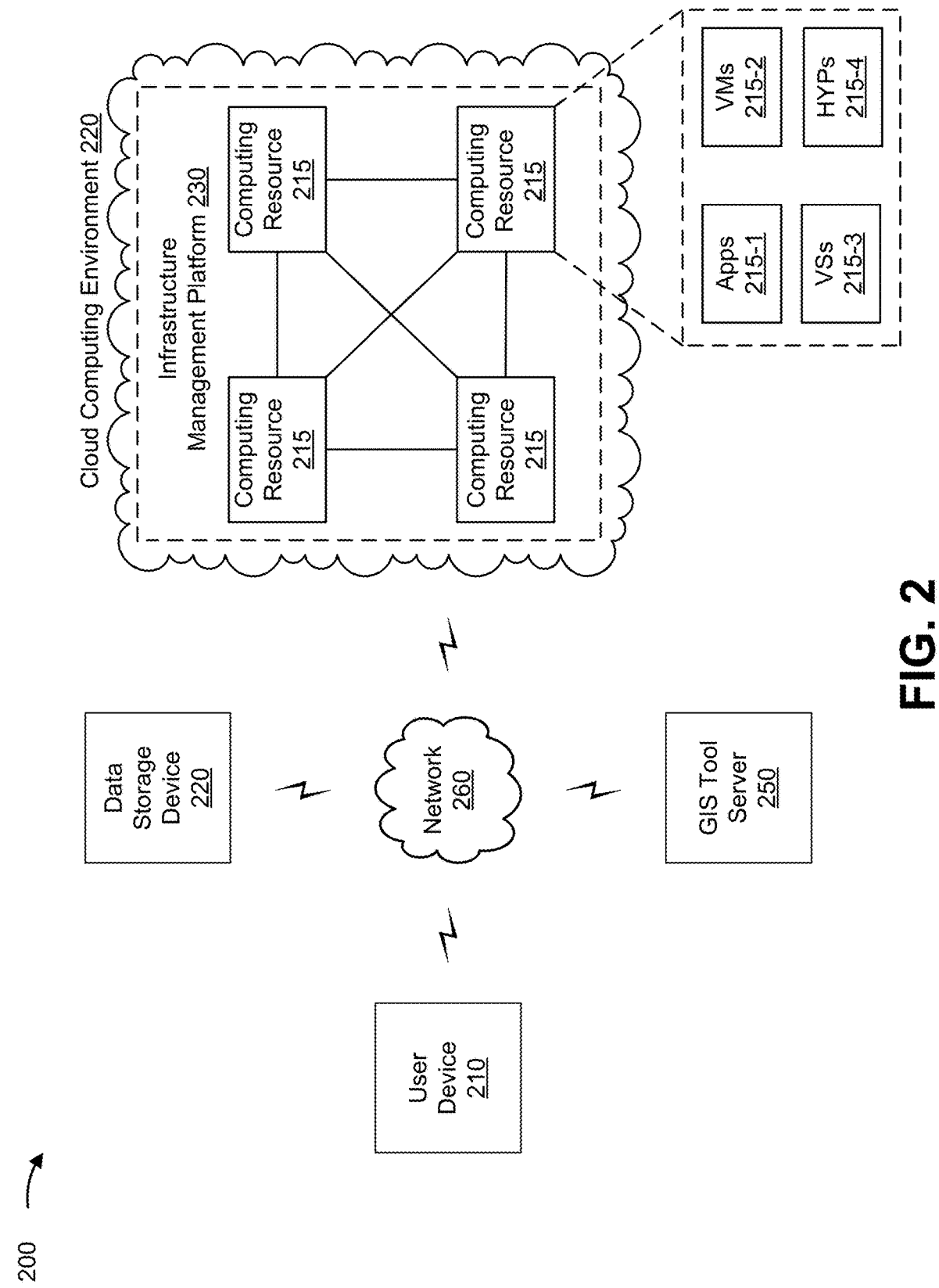
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a data storage device 220, an infrastructure management platform 230 hosted within a cloud computing environment 240, a geographic information system (GIS) tool server 250, and/or a network 260. Devices of environment 200 may interconnect via wired connections, wireless connections, or a combination of wired and wireless connections.

User device 210 includes one or more devices capable of receiving, generating, storing, processing, and/or providing information associated with an infrastructure design document. For example, user device 210 may include a device or machine, such as a mobile phone (e.g., a smart phone, a radiotelephone, and/or the like), a laptop computer, a tablet computer, a handheld computer, a server computer, a gaming device, a wearable communication device (e.g., a smart wristwatch, a pair of smart eyeglasses, and/or the like), or a similar type of device or machine.

In some implementations, a first user device 210 may access a GIS tool supported by GIS tool server 250 and/or infrastructure management platform 230 and may use the GIS tool to create and/or upload an infrastructure design document. This may cause the infrastructure design document to be provided to infrastructure management platform 230 for further processing. Additionally, or alternatively, a second user device 210 may use the GIS tool to verify and/or modify the infrastructure design document. This may cause feedback data to be provided to infrastructure management platform 230. In some implementations, the first user device 210 may, via an interface of the GIS tool, display the network design document, the feedback data, graphical representations of one or more pieces of equipment, recommendations generated by infrastructure management platform 230, and/or the like. This may allow the design engineer to use the first user device 210 to validate and/or modify the infrastructure design document (e.g., by approving feedback data, rejecting feedback data, and/or the like), which may cause additional feedback data to be provided to infrastructure management platform 230. In some implementations, user device 210 (e.g., the first user device 210, the second user device 210, etc.) may receive a report from infrastructure management platform 230.

Data storage device 220 includes one or more devices capable of receiving, storing, generating, determining, and/or providing information associated with an infrastructure design document. For example, data storage device 220 may include a server device or a group of server devices. In some implementations, data storage device 220 may provide historical data that may be used to train one or more data models to infrastructure management platform 230. For example, infrastructure management platform may request historical data from data storage device 220 which may cause data storage device 220 to provide infrastructure management platform 230 with the historical data. As another example, data storage device 200 may be configured to periodically provide infrastructure management platform 230 with historical data. In some implementations, a first data storage device 220 may store historical data that may be used to train one or more data models using machine learning. In this case, the first data storage device 220 may provide the historical data to infrastructure management platform 230 (e.g., based on receiving a request, periodically over a given time period, based on another type of trigger, etc.). Additionally, or alternatively, a second data storage device 220 may store the infrastructure design document, feedback data, recommendations generated by infrastructure management platform 230, and/or any other information used as part of the GIS tool.

Infrastructure management platform 230 includes one or more devices capable of receiving, storing, generating, determining, and/or providing information associated with an infrastructure design document. For example, infrastructure management platform 230 may include a server device (e.g., a host server, a web server, an application server, etc.), a data center device, or a similar device.

In some implementations, infrastructure management platform 230 may host the GIS tool that displays the infrastructure design document to user device 210. For example, the GIS tool may display the infrastructure design document by displaying a set of objects that represent a set of equipment, a set of structural components, a set of buildings, and/or the like. In some implementations, GIS tool server 250 may host the GIS tool, and infrastructure management platform 230 may interact with GIS tool server 250 to provide one or more services described herein. In some cases, the GIS tool may have separate sets of permissions for different types of users. For example, the GIS tool may have a first set of permissions for a first user (e.g., an inspector) and a second set of permissions for a second user (e.g., a design engineer). This may cause the GIS tool to have different interface displays for different users, may cause certain interface-accessible features of the GIS tool to be restricted to particular users, and/or the like. In some implementations, infrastructure management platform 230 may, via a feature of the GIS tool, support an audio call or a video call between two or more user devices 210. In some implementations, infrastructure management platform 230 may provide one or more additional services described elsewhere herein.

In some implementations, as shown, infrastructure management platform 230 may be hosted in cloud computing environment 240. While implementations described herein describe infrastructure management platform 230 as being hosted in cloud computing environment 240, in some implementations, infrastructure management platform 230 might not be cloud-based (i.e., may be implemented outside of a cloud computing environment) or may be partially cloud-based.

Cloud computing environment 240 includes an environment that hosts infrastructure management platform 230. Cloud computing environment 240 may provide computation, software, data access, storage, etc. services that do not require end-user knowledge of a physical location and configuration of system(s) and/or device(s) that hosts infrastructure management platform 230. As shown, cloud computing environment 240 may include a group of computing resources 235 (referred to collectively as "computing resources 235" and individually as "computing resource 235").

Computing resource 235 includes one or more personal computers, workstation computers, server devices, and/or another type of computation and/or communication device. In some implementations, computing resource 235 may host infrastructure management platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 210 and/or data storage device 220. Application 235-1 may eliminate a need to install and execute the software applications on these devices. For example, application 235-1 may include software associated with infrastructure management platform 230 and/or any other software capable of being provided via cloud computing environment 240. In some implementations, one application 235-1 may send/receive information to/from one or more other applications 235-1, via virtual machine 235-2. In some implementations, application 235-1 may be the GIS tool described herein. In some implementations, application 235-1 may provide one or more services described herein to the GIS tool (e.g., which may be hosted by GIS tool server 250).

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., user device 210, data storage device 220, etc.), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

GIS tool server 250 includes one or more devices capable of receiving, storing, processing, determining, and/or providing information associated with an infrastructure design document. For example, GIS tool server 250 may include a server device or a group of server devices. As described above, GIS tool server 250 may, in some implementations, support the GIS tool. In these implementations, infrastructure management platform 230 may interact with GIS tool server 250 provide one or more services described herein to the GIS tool.

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
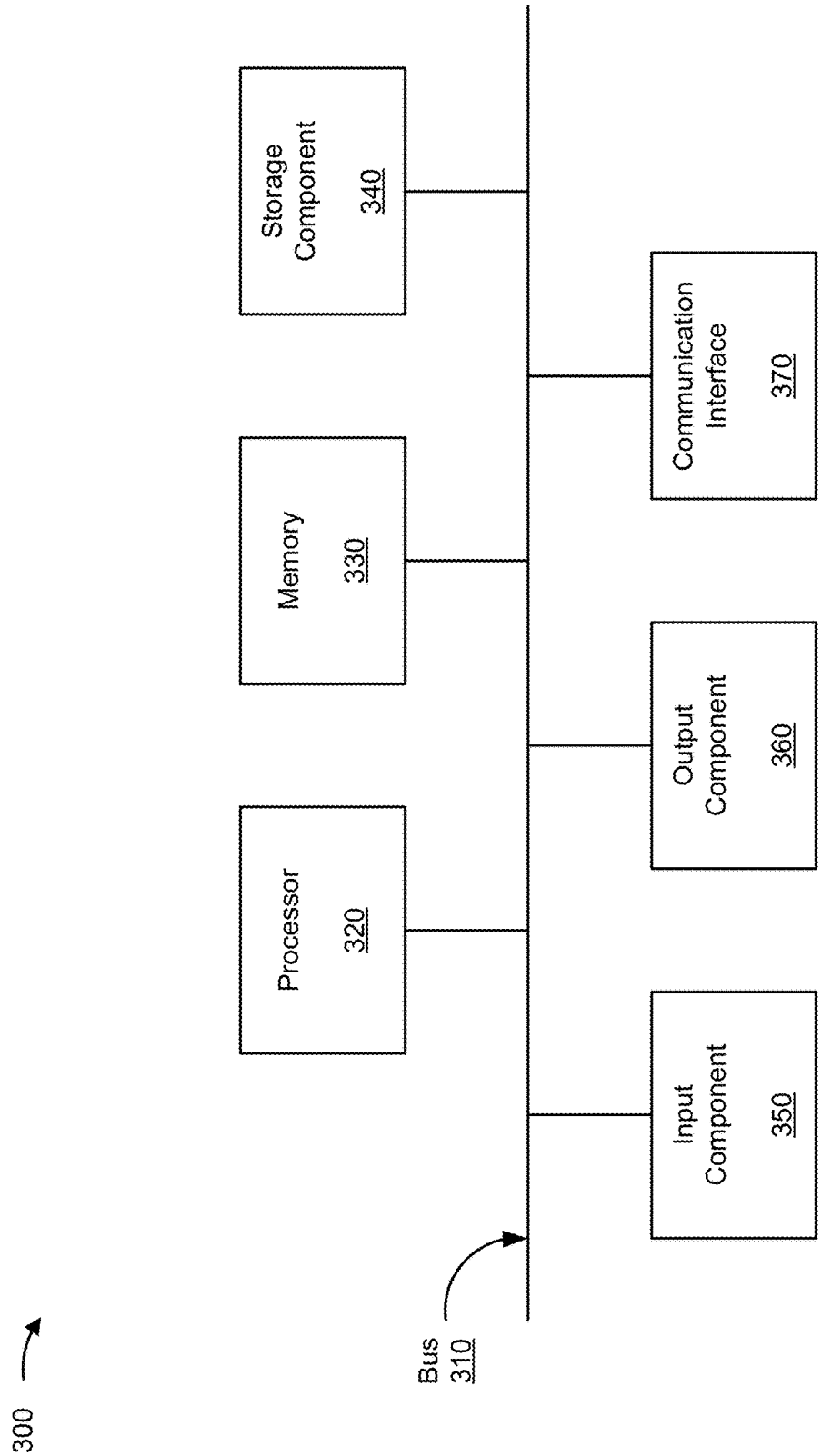
FIG. 3 is a diagram of example components of one or more devices of FIG. 2.

FIG. 3 is a diagram of example components of a device 300. Device 300 may correspond to user device 210, data storage device 220, infrastructure management platform 230, and/or GIS tool server 250. In some implementations, user device 210, data storage device 220, infrastructure management platform 230, and/or GIS tool server 250 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
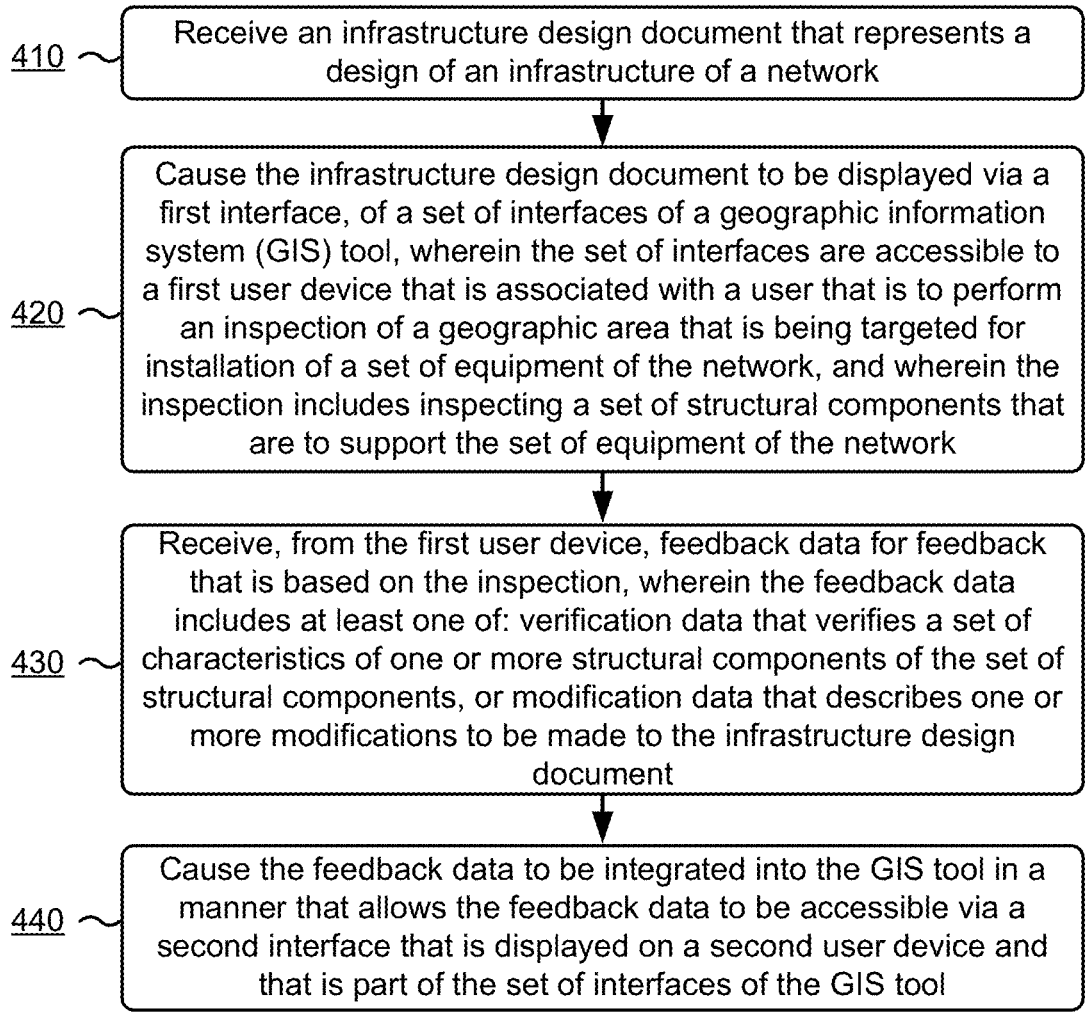
FIGS. 4-6 are flowcharts of one or more example processes for verifying, modifying, and/or validating an infrastructure design document via improved collaboration between on-site devices and remote devices.

FIG. 4 is a flow chart of an example process 400 for verifying, modifying, and/or validating an infrastructure design document via improved collaboration between on-site devices and remote devices. In some implementations, one or more process blocks of FIG. 4 may be performed by an infrastructure management platform (e.g., infrastructure management platform 230). In some implementations, one or more process blocks of FIG. 4 may be performed by another device or a group of devices separate from or including the infrastructure management platform, such as a user device (e.g., user device 210), a data storage device (e.g., data storage device 220), a geographic information system (GIS) server device (e.g., GIS server 250), and/or the like.

As shown in FIG. 4, process 400 may include receiving an infrastructure design document that represents a design of an infrastructure of a network (block 410). For example, the infrastructure management platform (e.g., using computing resource 235, processor 320, memory 330, storage component 340, input component 350, communication interface 370, and/or the like) may receive an infrastructure design document that represents a design of an infrastructure of a network, as described above.

As further shown in FIG. 4, process 400 may include causing the infrastructure design document to be displayed via a first interface, of a set of interfaces of a geographic information system (GIS) tool, wherein the set of interfaces are accessible to a first user device that is associated with a user that is to perform an inspection of a geographic area that is being targeted for installation of a set of equipment of the network, and wherein the inspection includes inspecting a set of structural components that are to support the set of equipment of the network (block 420). For example, the infrastructure management platform (e.g., using computing resource 235, processor 320, memory 330, storage component 340, input component 350, output component 360, communication interface 370, and/or the like) may cause the infrastructure design document to be displayed via a first interface, of a set of interfaces of a geographic information system (GIS) tool, as described above. In some implementations, the set of interfaces may be accessible to a first user device that is associated with a user that is to perform an inspection of a geographic area that is being targeted for installation of a set of equipment of the network. In some implementations, the inspection may include inspecting a set of structural components that are to support the set of equipment of the network.

As further shown in FIG. 4, process 400 may include receiving, from the first user device, feedback data for feedback that is based on the inspection, wherein the feedback data includes at least one of: verification data that verifies a set of characteristics of one or more structural components of the set of structural components, or modification data that describes one or more modifications to be made to the infrastructure design document (block 430). For example, the infrastructure management platform (e.g., using computing resource 235, processor 320, memory 330, storage component 340, input component 350, communication interface 370, and/or the like) may receive, from the first user device, feedback data for feedback that is based on the inspection, as described above. In some implementations, the feedback data includes at least one of: verification data that verifies a set of characteristics of one or more structural components of the set of structural components, or modification data that describes one or more modifications to be made to the infrastructure design document.

As further shown in FIG. 4, process 400 may include causing the feedback data to be integrated into the GIS tool in a manner that allows the feedback data to be accessible via a second interface that is displayed on a second user device and that is part of the set of interfaces of the GIS tool (block 440). For example, the infrastructure management platform (e.g., using computing resource 235, processor 320, memory 330, storage component 340, input component 350, output component 360, communication interface 370, and/or the like) may cause the feedback data to be integrated into the GIS tool in a manner that allows the feedback data to be accessible via a second interface that is displayed on a second user device and that is part of the set of interfaces of the GIS tool, as described above.

Process 400 may include additional implementations, such as any single implementation or any combination of implementations described below and/or in connection with one or more other processes described elsewhere herein.

In some implementations, the infrastructure management platform may receive, from the second user device, a set of instructions that are to be used to update the infrastructure design document. The set of instructions may include at least one of: a first set of instructions to validate information included in the feedback data, a second set of instructions to implement at least one of the one or more modifications included in the feedback, or a third set of instructions to implement one or more additional modifications. In some implementations, the infrastructure management platform may update the infrastructure design document based on the set of instructions. In some implementations, the infrastructure management platform may cause the infrastructure design document and the updated infrastructure design document to be displayed simultaneously on the first user device.

In some implementations, the feedback data may include particular feedback data for a structural component of the set of structural components. In some implementations, the particular feedback data may include location data that identifies a geographic location of the first user device at a time when the particular feedback data was generated. In some implementations, the infrastructure management platform may cause the feedback data to be integrated into the GIS tool in a manner that allows the particular feedback data to be accessible via the second interface.

In some implementations, the feedback data may include an image or a video that depicts a structural component of the set of structural components. In some implementations, the infrastructure management platform may generate a graphical representation of the structural component based on the image or the video. In some implementations, the infrastructure management platform may cause the feedback data and the graphical representation of the structural component to be displayed via the second interface.

In some implementations, the infrastructure management platform may generate a report that describes a set of attributes of the structural component. In some implementations, the infrastructure management platform may cause the report to be displayed via the first interface to permit the user to interact with the first user device to provide a digital signature. In some implementations, the infrastructure management platform may receive, from the first user device, the report that includes the digital signature of the user. In some implementations, the infrastructure management platform may cause the report that includes the digital signature to be provided to an account or to a particular device to permit the report that includes the digital signature to be used as verifiable proof of work completed during the inspection.

In some implementations, the feedback data may include patency data associated with one or more structural components, of the set of structural components, that include an internal space. In some implementations, infrastructure management platform may cause a graphical representation of the one or more structural components to be displayed. In some implementations, the infrastructure management platform may perform one or more actions that allow the infrastructure design document to be used when implementing the infrastructure of the network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
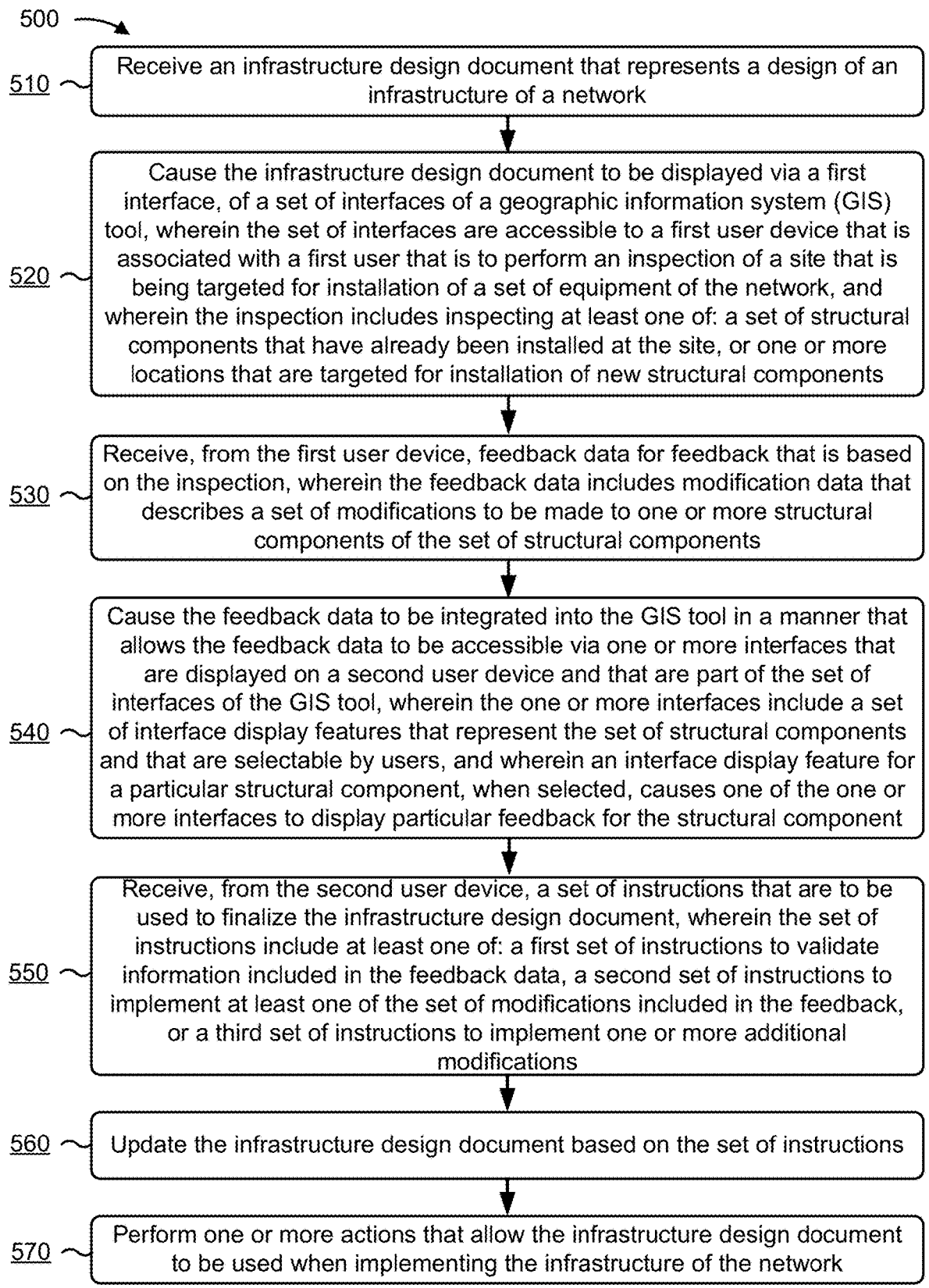

FIG. 5 is a flow chart of an example process 500 for verifying, modifying, and/or validating an infrastructure design document via improved collaboration between on-site devices and remote devices. In some implementations, one or more process blocks of FIG. 5 may be performed by an infrastructure management platform (e.g., infrastructure management platform 230). In some implementations, one or more process blocks of FIG. 5 may be performed by another device or a group of devices separate from or including the infrastructure management platform, such as a user device (e.g., user device 210), a data storage device (e.g., data storage device 220), a geographic information system (GIS) server device (e.g., GIS server 250), and/or the like.

As shown in FIG. 5, process 500 may include receiving an infrastructure design document that represents a design of an infrastructure of a network (block 510). For example, the infrastructure management platform (e.g., using computing resource 235, processor 320, memory 330, storage component 340, input component 350, communication interface 370, and/or the like) may receive an infrastructure design document that represents a design of an infrastructure of a network, as described above.

As further shown in FIG. 5, process 500 may include causing the infrastructure design document to be displayed via a first interface, of a set of interfaces of a geographic information system (GIS) tool, wherein the set of interfaces are accessible to a first user device that is associated with a first user that is to perform an inspection of a site that is being targeted for installation of a set of equipment of the network, and wherein the inspection includes inspecting at least one of: a set of structural components that have already been installed at the site, or one or more locations that are targeted for installation of new structural components (block 520). For example, the infrastructure management platform (e.g., using computing resource 235, processor 320, memory 330, storage component 340, input component 350, output component 360, communication interface 370, and/or the like) may cause the infrastructure design document to be displayed via a first interface, of a set of interfaces of a geographic information system (GIS) tool, as described above. In some implementations, the set of interfaces may be accessible to a first user device that is associated with a first user that is to perform an inspection of a site that is being targeted for installation of a set of equipment of the network. In some implementations, the inspection may include inspecting at least one of: a set of structural components that have already been installed at the site, or one or more locations that are targeted for installation of new structural components.

As further shown in FIG. 5, process 500 may include receiving, from the first user device, feedback data for feedback that is based on the inspection, wherein the feedback data includes modification data that describes a set of modifications to be made to one or more structural components of the set of structural components (block 530). For example, the infrastructure management platform (e.g., using computing resource 235, processor 320, memory 330, storage component 340, input component 350, communication interface 370, and/or the like) may receive, from the first user device, feedback data for feedback that is based on the inspection, as described above. In some implementations, the feedback data may include modification data that describes a set of modifications to be made to one or more structural components of the set of structural components.

As further shown in FIG. 5, process 500 may include causing the feedback data to be integrated into the GIS tool in a manner that allows the feedback data to be accessible via one or more interfaces that are displayed on a second user device and that are part of the set of interfaces of the GIS tool, wherein the one or more interfaces include a set of interface display features that represent the set of structural components and that are selectable by users, and wherein an interface display feature for a particular structural component, when selected, causes one of the one or more interfaces to display particular feedback for the structural component (block 540). For example, the infrastructure management platform (e.g., using computing resource 235, processor 320, memory 330, storage component 340, input component 350, output component 360, communication interface 370, and/or the like) may cause the feedback data to be integrated into the GIS tool in a manner that allows the feedback data to be accessible via one or more interfaces that are displayed on a second user device and that are part of the set of interfaces of the GIS tool, as described above. In some implementations, the one or more interfaces may include a set of interface display features that represent the set of structural components and that are selectable by users. In some implementations, an interface display feature for a particular structural component, when selected, may cause one of the one or more interfaces to display particular feedback for the structural component.

As further shown in FIG. 5, process 500 may include receiving, from the second user device, a set of instructions that are to be used to update the infrastructure design document, wherein the set of instructions include at least one of: a first set of instructions to validate information included in the feedback data, a second set of instructions to implement at least one of the set of modifications included in the feedback, or a third set of instructions to implement one or more additional modifications (block 550). For example, the infrastructure management platform (e.g., using computing resource 235, processor 320, memory 330, storage component 340, input component 350, communication interface 370, and/or the like) may receive, from the second user device, a set of instructions that are to be used to update the infrastructure design document, as described above. In some implementations, the set of instructions include at least one of: a first set of instructions to validate information included in the feedback data, a second set of instructions to implement at least one of the set of modifications included in the feedback, or a third set of instructions to implement one or more additional modifications.

As further shown in FIG. 5, process 500 may include updating the infrastructure design document based on the set of instructions (block 560). For example, the infrastructure management platform (e.g., using computing resource 235, processor 320, memory 330, storage component 340, output component 360, communication interface 370, and/or the like) may update the infrastructure design document based on the set of instructions, as described above.

As further shown in FIG. 5, process 500 may include performing one or more actions that allow the infrastructure design document to be used when implementing the infrastructure of the network (block 570). For example, the infrastructure management platform (e.g., using computing resource 235, processor 320, memory 330, storage component 340, input component 350, output component 360, communication interface 370, and/or the like) may perform one or more actions that allow the infrastructure design document to be used when implementing the infrastructure of the network, as described above.

Process 500 may include additional implementations, such as any single implementation or any combination of implementations described below and/or in connection with one or more other processes described elsewhere herein.

In some implementations, the set of equipment includes a set of fiber optic cables. In some implementations, the set of structural components include at least one of: a set of ducts capable of housing the set of fiber optic cables, or a set of manholes that provide access to the set of ducts.

In some implementations, the feedback data may include an image or a video that depicts a structural component of the set of structural components. In some implementations, the infrastructure management platform may generate a graphical representation of the structural component based on the image or the video. In some implementations, the infrastructure management platform may populate one or more fields of a report to describe a set of attributes of the structural component. In some implementations, the infrastructure management platform may cause the report to be displayed via the first interface to permit the first user to interact with the first user device to provide a digital signature. In some implementations, the infrastructure management platform may receive, from the first user device, the report that includes the digital signature of the first user. In some implementations, the infrastructure management platform may cause the report that includes the digital signature to be provided to an account or to a particular device to permit the report that includes the digital signature to be used as verifiable proof of work completed during the inspection.

In some implementations, the infrastructure management platform may receive a request to establish a connection between the first user device and the second user device. In some implementations, the connection may be an audio connection or a video connection. In some implementations, the infrastructure management platform may cause the connection to be established to allow the user performing the inspection to use the first user device to communicate with a second user that is accessing the second user device. In some implementations, the first user device and the second user device are permitted to access the set of interfaces of the GIS tool while the connection is active.

In some implementations, the feedback data may include verification data that verifies a set of characteristics of at least a subset of the set of structural components.

In some implementations, the infrastructure management platform may provide the infrastructure design document and the feedback data as input to a data model that has been trained using one or more machine learning techniques, to cause the data model to output a set of scores that indicate likelihoods of particular verifications or particular modifications being accurate or appropriate. In some implementations, the infrastructure management platform may generate one or more recommendations based on the set of scores. In some implementations, the infrastructure management platform may cause the feedback data and the one or more recommendations to be displayed via the one or more interfaces.

In some implementations, the infrastructure management platform may generate, based on an analysis of the infrastructure design document that has been updated, a bid for a construction project to build or install at least a portion of the infrastructure of the network. In some implementations, the infrastructure management platform may provide the bid for display via a bidding interface that is accessible to a group of devices associated with one or more construction companies.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
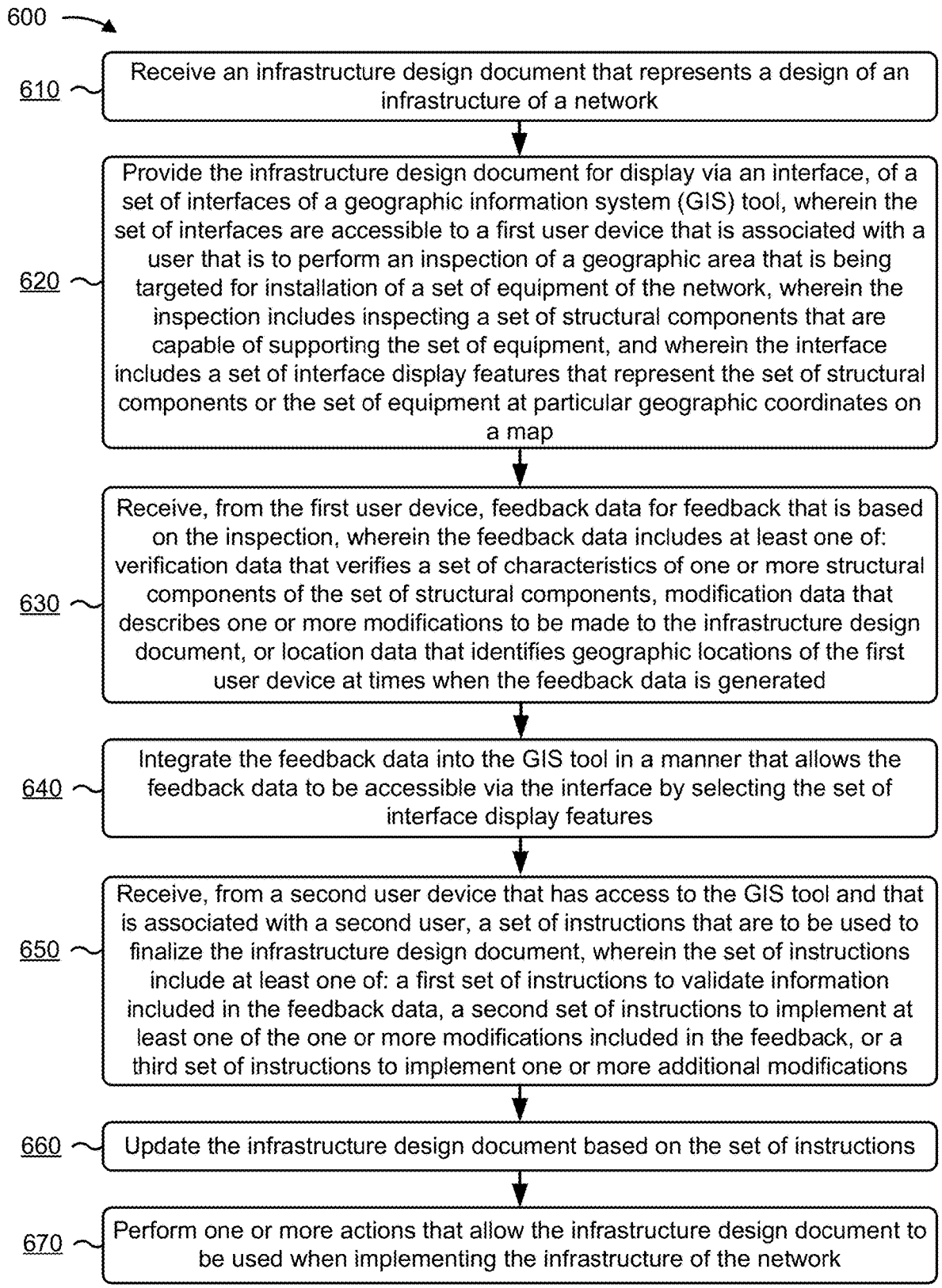

FIG. 6 is a flow chart of an example process 600 for verifying, modifying, and/or validating an infrastructure design document via improved collaboration between on-site devices and remote devices. In some implementations, one or more process blocks of FIG. 6 may be performed by an infrastructure management platform (e.g., infrastructure management platform 230). In some implementations, one or more process blocks of FIG. 6 may be performed by another device or a group of devices separate from or including the infrastructure management platform, such as a user device (e.g., user device 210), a data storage device (e.g., data storage device 220), a geographic information system (GIS) server device (e.g., GIS server 250), and/or the like.

As shown in FIG. 6, process 600 may include receiving an infrastructure design document that represents a design of an infrastructure of a network (block 610). For example, the infrastructure management platform (e.g., using computing resource 235, processor 320, memory 330, storage component 340, input component 350, communication interface 370, and/or the like) may receive an infrastructure design document that represents a design of an infrastructure of a network, as described above.

As further shown in FIG. 6, process 600 may include providing the infrastructure design document for display via an interface, of a set of interfaces of a geographic information system (GIS) tool, wherein the set of interfaces are accessible to a first user device that is associated with a user that is to perform an inspection of a geographic area that is being targeted for installation of a set of equipment of the network, wherein the inspection includes inspecting a set of structural components that are capable of supporting the set of equipment, and wherein the interface includes a set of interface display features that represent the set of structural components or the set of equipment at particular geographic coordinates on a map (block 620). For example, the infrastructure management platform (e.g., using computing resource 235, processor 320, memory 330, storage component 340, output component 360, communication interface 370, and/or the like) may provide the infrastructure design document for display via an interface, of a set of interfaces of a geographic information system (GIS) tool, as described above. In some implementations, the set of interfaces may be accessible to a first user device that is associated with a user that is to perform an inspection of a geographic area that is being targeted for installation of a set of equipment of the network. In some implementations, the inspection may include inspecting a set of structural components that are capable of supporting the set of equipment. In some implementations, the interface may include a set of interface display features that represent the set of structural components or the set of equipment at particular geographic coordinates on a map.

As further shown in FIG. 6, process 600 may include receiving, from the first user device, feedback data for feedback that is based on the inspection, wherein the feedback data includes at least one of: verification data that verifies a set of characteristics of one or more structural components of the set of structural components, modification data that describes one or more modifications to be made to the infrastructure design document, or location data that identifies geographic locations of the first user device at times when the feedback data is generated (block 630). For example, the infrastructure management platform (e.g., using computing resource 235, processor 320, memory 330, storage component 340, input component 350, communication interface 370, and/or the like) may receive, from the first user device, feedback data for feedback that is based on the inspection, as described above. In some implementations, the feedback data includes at least one of: verification data that verifies a set of characteristics of one or more structural components of the set of structural components, modification data that describes one or more modifications to be made to a subset of the set of structural components, or location data that identifies geographic locations of the first user device at times when the feedback data is generated.

As further shown in FIG. 6, process 600 may include integrating the feedback data into the GIS tool in a manner that allows the feedback data to be accessible via the interface by selecting the set of interface display features (block 640). For example, the infrastructure management platform (e.g., using computing resource 235, processor 320, memory 330, storage component 340, and/or the like) may integrate the feedback data into the GIS tool in a manner that allows the feedback data to be accessible via the interface by selecting the set of interface display features, as described above.

As further shown in FIG. 6, process 600 may include receiving, from a second user device that has access to the GIS tool and that is associated with a second user, a set of instructions that are to be used to update the infrastructure design document, wherein the set of instructions include at least one of: a first set of instructions to validate information included in the feedback data, a second set of instructions to implement at least one of the one or more modifications included in the feedback, or a third set of instructions to implement one or more additional modifications (block 650). For example, the infrastructure management platform (e.g., using computing resource 235, processor 320, memory 330, storage component 340, input component 350, communication interface 370, and/or the like) may receive, from a second user device that has access to the GIS tool and that is associated with a second user, a set of instructions that are to be used to update the infrastructure design document, as described above. In some implementations, the set of instructions include at least one of: a first set of instructions to validate information included in the feedback data, a second set of instructions to implement at least one of the one or more modifications included in the feedback, or a third set of instructions to implement one or more additional modifications.

As further shown in FIG. 6, process 600 may include updating the infrastructure design document based on the set of instructions (block 660). For example, the infrastructure management platform (e.g., using computing resource 235, processor 320, memory 330, storage component 340, and/or the like) may update the infrastructure design document based on the set of instructions, as described above.

As further shown in FIG. 6, process 600 may include performing one or more actions that allow the infrastructure design document to be used when implementing the infrastructure of the network (block 670). For example, the infrastructure management platform (e.g., using computing resource 235, processor 320, memory 330, storage component 340, input component 350, output component 360, communication interface 370, and/or the like) may perform one or more actions that allow the infrastructure design document to be used when implementing the infrastructure of the network, as described above.

Process 600 may include additional implementations, such as any single implementation or any combination of implementations described below and/or in connection with one or more other processes described elsewhere herein.

In some implementations, the set of equipment includes a set of fiber optic cables. In some implementations, the set of structural components include: a set of ducts capable of housing the set of fiber optic cables, and a set of manholes that provide access to the set of ducts.

In some implementations, the feedback data may include one or more images or a video that depicts a structural component of the set of structural components. In some implementations, the infrastructure management platform may identify information relating to the structural component by processing at least one of: the infrastructure design document, the feedback data, or a graphical representation of the structural component that is based on the one or more images or the video. In some implementations, the infrastructure management platform may populate a set of fields of a report with the information relating to the structural component. In some implementations, the infrastructure management platform may cause the report to be displayed via the first interface to permit the user to interact with the first user device to provide a digital signature. In some implementations, the infrastructure management platform may receive, from the first user device, the report that includes the digital signature of the first user. In some implementations, the infrastructure management platform may cause the report that includes the digital signature to be provided to an account or to a particular device to permit the report that includes the digital signature to be used as verifiable proof of work completed during the inspection.

In some implementations, the set of attributes include at least one of: one or more measurements of the structural component, one or more materials that comprise the structural component, or contents inside of the structural component.

In some implementations, the infrastructure management platform may receive a request to establish a connection between the first user device and the second user device. In some implementations, the connection may be an audio connection or a video connection. In some implementations, the infrastructure management platform may cause the connection to be established to allow the user performing the inspection to use the first user device to communicate with another user that is accessing the second user device. In some implementations, the first user device and the second user device may be permitted to access the set of interfaces of the GIS tool while the connection is active.

In some implementations, the infrastructure management platform may provide the infrastructure design document and the feedback data as input to a data model that has been trained using one or more machine learning techniques to cause the data model to output a set of scores that indicate likelihoods of particular feedback being accurate or appropriate. In some implementations, the infrastructure management platform may generate one or more recommendations based on the set of scores. In some implementations, the infrastructure management platform may provide the feedback data and the one or more recommendations for display via the interface.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, an infrastructure design document that represents a design of an infrastructure of a network;
   causing, by the device, the infrastructure design document to be displayed via a first interface, of a set of interfaces of a geographic information system (GIS) tool,
      wherein the set of interfaces are accessible to a first user device that is associated with a user that is to perform an inspection of a geographic area that is being targeted for installation of a set of equipment of the network, and
      wherein the inspection includes inspecting a set of structural components that are to support the set of equipment of the network;
   receiving, by the device and from the first user device, feedback data for feedback that is based on the inspection,
      wherein the feedback data includes a video that depicts a structural component of the set of structural component, and
      wherein the feedback data includes at least one of:
         verification data that verifies a set of characteristics of one or more structural components of the set of structural components,
            wherein the verification data includes one or more of:
               information for verifying a level of quality of the one or more structural components, or
               information for verifying whether the one or more structural components are available for supporting a particular piece of equipment of the set of equipment;
   generating, by the device, a representation of the structural component based on the video; and
   causing, by the device, the feedback data to be integrated into the GIS tool in a manner that allows the feedback data and the representation to be accessible via a second interface that is displayed on a second user device and that is part of the set of interfaces of the GIS tool.

2. The method of claim 1, further comprising:
   receiving, from the second user device, a set of instructions that are to be used to update the infrastructure design document,
      wherein the set of instructions include at least one of:
         a first set of instructions to validate information included in the feedback data, or
         a second set of instructions to implement one or more modifications;
   updating the infrastructure design document based on the set of instructions; and
   causing the infrastructure design document and the updated infrastructure design document to be displayed simultaneously on the first user device.

3. The method of claim 1, wherein the feedback data includes particular feedback data for a structural component of the set of structural components;
   wherein the particular feedback data includes location data that identifies a geographic location of the first user device at a time when the particular feedback data was generated; and
   wherein causing the feedback data to be integrated into the GIS tool comprises:

causing the particular feedback data to be integrated into the GIS tool in a manner that allows the particular feedback data to be accessible via the second interface.

4. The method of claim 1, further comprising:
generating a report that describes a set of attributes of the structural component;
causing the report to be displayed via the first interface to permit the user to interact with the first user device to provide a digital signature;
receiving, from the first user device, the report that includes the digital signature of the user; and
causing the report that includes the digital signature to be provided to an account or to a particular device to permit the report that includes the digital signature to be used as verifiable proof of work completed during the inspection.

5. The method of claim 1, wherein the feedback data includes patency data associated with the one or more structural components that include an internal space; and
wherein the method further comprises:
causing a graphical representation of the one or more structural components to be displayed.

6. The method of claim 1, further comprising:
performing one or more actions that allow the infrastructure design document to be used when implementing the infrastructure of the network.

7. The method of claim 1, further comprising:
populating one or more fields of a report to describe a set of attributes of the structural component;
causing the report to be displayed via the first interface to permit the first user to interact with the first user device to provide a digital signature;
receiving, from the first user device, the report that includes the digital signature of the first user; and
causing the report that includes the digital signature to be provided to an account or to a particular device to permit the report that includes the digital signature to be used as verifiable proof of work completed during the inspection.

8. A device, comprising:
one or more memories; and
one or more processors, operatively coupled to the one or more memories, to:
receive an infrastructure design document that represents a design of an infrastructure of a network;
cause the infrastructure design document to be displayed via a first interface, of a set of interfaces of a geographic information system (GIS) tool,
wherein the set of interfaces are accessible to a first user device that is associated with a first user that is to perform an inspection of a site that is being targeted for installation of a set of equipment of the network, and
wherein the inspection includes inspecting at least one of:
a set of structural components that have already been installed at the site, or
one or more locations that are targeted for installation of new structural components;
receive, from the first user device, feedback data for feedback that is based on the inspection,
wherein the feedback data includes a video that depicts a structural component of the set of structural component, and
wherein the feedback data includes verification data that verifies a set of characteristics of at least a subset of the set of structural components,
wherein the verification data includes one or more of:
information for verifying a level of quality of the subset of the set of structural components, or
information for verifying whether the subset of the set of structural components are available for supporting a particular piece of equipment of the set of equipment;
generate a representation of the structural component based on the video;
cause the feedback data to be integrated into the GIS tool in a manner that allows the feedback data and the representation to be accessible via one or more interfaces that are displayed on a second user device and that are part of the set of interfaces of the GIS tool,
wherein the one or more interfaces include a set of interface display features that represent the set of structural components and that are selectable by users, and
wherein an interface display feature for a particular structural component, of the set of structural components, when selected, causes one of the one or more interfaces to display particular feedback for the structural component;
receive a set of instructions that are to be used to update the infrastructure design document,
wherein the set of instructions include at least one of:
a first set of instructions to validate information included in the feedback data, or
a second set of instructions to implement one or more modifications;
update the infrastructure design document based on the set of instructions; and
perform one or more actions that allow the infrastructure design document to be used when implementing the infrastructure of the network.

9. The device of claim 8, wherein the set of equipment includes at least one of:
a set of fiber optic cables,
a set of street cabinets,
a set of transmission lines, or
a set of devices located at a set of distribution points; and
wherein the set of structural components include at least one of:
a set of ducts capable of housing the set of cables,
a set of manholes that provide access to the set of ducts, or
a set of utility poles that support the set of transmission lines or the set of devices.

10. The device of claim 8,
wherein the one or more processors are further to:
populate one or more fields of a report to describe a set of attributes of the structural component;
cause the report to be displayed via the first interface to permit the first user to interact with the first user device to provide a digital signature;
receive, from the first user device, the report that includes the digital signature of the first user; and
cause the report that includes the digital signature to be provided to an account or to a particular device to permit the report that includes the digital signature to be used as verifiable proof of work completed during the inspection.

11. The device of claim 8, wherein the one or more processors are further to:
receive a request to establish a connection between the first user device and the second user device,
wherein the connection is an audio connection or a video connection; and
cause the connection to be established to allow the user performing the inspection to use the first user device to communicate with a second user that is accessing the second user device,
wherein the first user device and the second user device are permitted to access the set of interfaces of the GIS tool while the connection is active.

12. The device of claim 8, wherein the one or more processors are further to:
provide the infrastructure design document and the feedback data as input to a data model that has been trained using one or more machine learning techniques to cause the data model to output a set of scores that indicate likelihoods of particular verifications or particular modifications being accurate or appropriate;
generate one or more recommendations based on the set of scores; and
wherein the one or more processors, when causing the feedback data to be displayed via the one or more interfaces, are to:
cause the feedback data and the one or more recommendations to be displayed via the one or more interfaces.

13. The device of claim 8, wherein the one or more processors, when performing the one or more actions, are to:
generate, based on an analysis of the infrastructure design document that has been updated, a bid for a construction project to build or install at least a portion of the infrastructure of the network; and
provide the bid for display via a bidding interface that is accessible to a group of devices associated with one or more construction companies.

14. The device of claim 8, wherein the one or more processors are further to:
provide the infrastructure design document and the feedback data as input to a data model that has been trained using one or more machine learning techniques to cause the data model to output a set of scores that indicate likelihoods of particular feedback being accurate or appropriate;
generate one or more recommendations based on the set of scores; and
wherein the one or more processors, when providing the feedback data to be displayed via the interface, are to:
provide the feedback data and the one or more recommendations for display via the interface.

15. A non-transitory computer-readable medium storing instructions, the instructions comprising:
one or more instructions that, when executed by one or more processors, cause the one or more processors to:
receive an infrastructure design document that represents a design of an infrastructure of a network;
provide the infrastructure design document for display via an interface, of a set of interfaces of a geographic information system (GIS) tool,
wherein the set of interfaces are accessible to a first user device that is associated with a user that is to perform an inspection of a geographic area that is being targeted for installation of a set of equipment of the network,
wherein the inspection includes inspecting a set of structural components that are capable of supporting the set of equipment, and
wherein the interface includes a set of interface display features that represent the set of structural components or the set of equipment at particular geographic coordinates on a map;
receive, from the first user device, feedback data for feedback that is based on the inspection,
wherein the feedback data includes a video that depicts a structural component of the set of structural component, and
wherein the feedback data includes at least one of:
verification data that verifies a set of characteristics of one or more structural components of the set of structural components,
wherein the verification data includes one or more of:
information for verifying a level of quality of the one or more structural components, or
information for verifying whether the one or more structural components are available for supporting a particular piece of equipment of the set of equipment;
generate a representation of the structural component based on the video;
integrate the feedback data into the GIS tool in a manner that allows the feedback data and the representation to be accessible via the interface by selecting the set of interface display features;
receive, from a second user device that has access to the GIS tool and that is associated with a second user, data set of instructions that are to be used to update the infrastructure design document,
wherein the set of instructions include at least one of:
a first set of instructions to validate information included in the feedback data, or
a second set of instructions to implement one or more modifications;
update the infrastructure design document based on the set of instructions; and
perform one or more actions that allow the infrastructure design document to be used when implementing the infrastructure of the network.

16. The non-transitory computer-readable medium of claim 15, wherein the set of equipment include a set of fiber optic cables; and
wherein the set of structural components include:
a set of ducts capable of housing the set of cables, and
a set of manholes that provide access to the set of ducts.

17. The non-transitory computer-readable medium of claim 15,
wherein the one or more instructions, when executed by the one or more processors, further cause the one or more processors to:
identify information relating to the structural component by processing at least one of:
the infrastructure design document,
the feedback data, or
the representation of the structural component that is based on the video;
populate a set of fields of a report with the information relating to the structural component;

cause the report to be displayed via a first interface to permit the user to interact with the first user device to provide a digital signature;

receive, from the first user device, the report that includes the digital signature of the first user; and cause the report that includes the digital signature to be provided to an account or to a particular device to permit the report that includes the digital signature to be used as verifiable proof of work completed during the inspection.

18. The non-transitory computer-readable medium of claim 17, wherein the set of attributes include at least one of:

one or more measurements of the structural component, one or more materials that comprise the structural component, or contents inside of the structural component.

19. The non-transitory computer-readable medium of claim 15, wherein the one or more instructions, when executed by the one or more processors, further cause the one or more processors to:

receive a request to establish a connection between the first user device and the second user device, wherein the connection is an audio connection or a video connection; and cause the connection to be established to allow the user performing the inspection to use the first user device to communicate with another user that is accessing the second user device, wherein the first user device and the second user device are permitted to access the set of interfaces of the GIS tool while the connection is active.

20. The non-transitory computer-readable medium of claim 15, wherein the one or more instructions, when executed by the one or more processors, further cause the one or more processors to:

provide the infrastructure design document and the feedback data as input to a data model that has been trained using one or more machine learning techniques to cause the data model to output a set of scores that indicate likelihoods of particular feedback being accurate or appropriate;

generate one or more recommendations based on the set of scores; and wherein the one or more instructions, that cause the one or more processors to provide the feedback data to be displayed via the interface, cause the one or more processors to:

provide the feedback data and the one or more recommendations for display via the interface.

* * * * *